(12) United States Patent
Kamma et al.

(10) Patent No.: US 11,120,476 B2
(45) Date of Patent: Sep. 14, 2021

(54) SYSTEMS AND METHODS FOR GENERATING PERSONALIZED ADVERTISEMENTS

(71) Applicant: SocialMiningAi, Inc., San Antonio, TX (US)

(72) Inventors: Sridhar Kamma, San Antonio, TX (US); Sujatha Kamma, San Antonio, TX (US); Suman Poluri, Round Rock, TX (US)

(73) Assignee: SocialMiningAi, Inc., San Antonio, TX (US)

( * ) Notice: Subject to any disclaimer, the term of this patent is extended or adjusted under 35 U.S.C. 154(b) by 0 days.

(21) Appl. No.: 16/806,435

(22) Filed: Mar. 2, 2020

(65) Prior Publication Data

US 2020/0279299 A1 Sep. 3, 2020

Related U.S. Application Data

(60) Provisional application No. 62/812,972, filed on Mar. 2, 2019.

(51) Int. Cl.
*G06Q 30/02* (2012.01)
*G06N 20/00* (2019.01)
(Continued)

(52) U.S. Cl.
CPC ......... *G06Q 30/0269* (2013.01); *G06F 40/30* (2020.01); *G06N 20/00* (2019.01);
(Continued)

(58) Field of Classification Search
None
See application file for complete search history.

(56) References Cited

U.S. PATENT DOCUMENTS

2006/0282328 A1 12/2006 Gerace et al.
2008/0162268 A1 7/2008 Gilbert
(Continued)

OTHER PUBLICATIONS

E. Rohini Srihari, "How can NLP technology be used for marketing?", available one Mar. 16, 2016, retrieved from https://econsultancy.com/how-can-nlp-technology-be-used-for-marketing/ (Year: 2016).*

(Continued)

*Primary Examiner* — Sam Refai
(74) *Attorney, Agent, or Firm* — Shah IP Law, PLLC

(57) ABSTRACT

In an aspect of the disclosure, a method, a computer-readable medium, and an apparatus are provided. The apparatus may receive digital data associated with digital media communications. The apparatus may input the textual data into a NLP model. The apparatus may obtain intent data associated with an item as an output of the NLP model. The apparatus may input the intent data into a tagging model. The apparatus may obtain an attribute tag as an output of the tagging model. The apparatus may determine whether the intent data meets a likelihood threshold. The apparatus may determine whether the attribute tag meet a relevance threshold. The apparatus may output the intent data and the attribute tag to an external device upon determining that the intent data meets the likelihood threshold and that the attribute tag meets the relevance threshold.

6 Claims, 15 Drawing Sheets

(51) Int. Cl.
  *G06F 40/30* (2020.01)
  *G06N 5/04* (2006.01)
(52) U.S. Cl.
  CPC ..... *G06Q 30/0255* (2013.01); *G06Q 30/0276* (2013.01); *G06N 5/04* (2013.01)

(56) References Cited

U.S. PATENT DOCUMENTS

| | | | | |
|---|---|---|---|---|
| 2014/0156341 | A1* | 6/2014 | Kruk | G06Q 50/01 |
| | | | | 705/7.29 |
| 2014/0189002 | A1* | 7/2014 | Orioli | H04L 51/046 |
| | | | | 709/204 |
| 2015/0120386 | A1* | 4/2015 | Sherman | G06Q 50/01 |
| | | | | 705/7.31 |
| 2015/0227579 | A1* | 8/2015 | Cantarero | G06F 16/313 |
| | | | | 707/708 |
| 2016/0217515 | A1 | 7/2016 | Vijayaraghavan et al. | |
| 2017/0024640 | A1 | 1/2017 | Deng et al. | |
| 2017/0345054 | A1 | 11/2017 | Sinha et al. | |
| 2018/0150851 | A1 | 5/2018 | Ouimet | |
| 2018/0285691 | A1 | 10/2018 | Grindstaff et al. | |
| 2019/0164082 | A1 | 5/2019 | Wu | |

OTHER PUBLICATIONS

Sahoo et al., Learning Deep Neural Network on the Fly, 2017, www.arxiv.org (Year: 2017).

Zhu et al., What to do next—Modeling user behaviors by Time-LSTM, May 4, 2017, www.ijcai.org (Year: 2017).

* cited by examiner

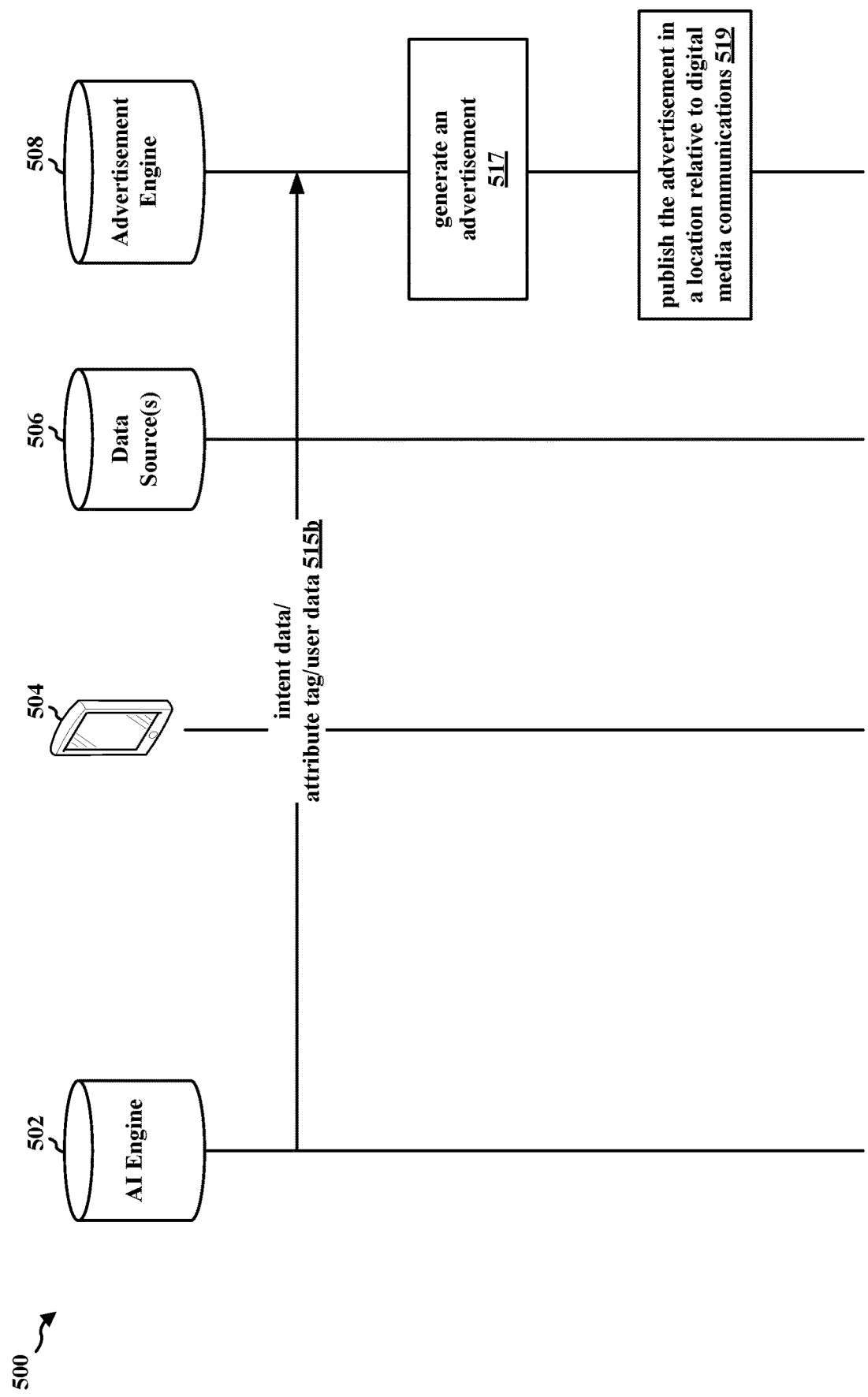

SYSTEMS AND METHODS FOR GENERATING PERSONALIZED ADVERTISEMENTS

CROSS-REFERENCE TO RELATED APPLICATION(S)

This application claims the benefit of U.S. Provisional Application Ser. No. 62/812,972, entitled "A HYPER AD TARGETING PROCESS TO DISPLAY AD BASED ON HIGH PURCHASE INTENT OF A PRODUCT OR A SERVICE BASED ON SOCIAL, DIGITAL, IMAGE BASED POSTS, COMMUNICATION OR MESSAGING CHANNELS" and filed on Mar. 2, 2019, which is expressly incorporated by reference herein in its entirety.

BACKGROUND

Field

The present disclosure relates generally to advertisement systems, and more particularly, to an advertisement system that generates targeted digital advertisements.

Background

Digital media advertisers today use significant amount of digital data to target advertisements to prospects who may be interested in purchasing a product or a service offering. Specifically, digital media advertisers may use demographic, behavior, and social networking data from digital media platforms and social media networks to identify users who may find a particular advertisement relevant.

Although these methodologies tend to be more targeted than the methodologies of the past, such as advertising in a phone book or on a billboard, the current technology still suffers from an inherent problem: advertisers are still targeting prospects based on one or more inferences about the likelihood that a prospect may purchase a product or a service offering. As a result, today's ad targeting technologies, although better, are still effectively guessing as to a prospect's desires. Therefore, today's ad targeting technologies are not very effective at placing the right advertisements in front of the right prospects at the right time (at the time that a decision to make a purchase is manifested).

What is needed is a new and a more effective way to target prospects for advertisements or offerings. Moreover, in order to be successful in today's environment, the new technology must overcome many of the technical challenges associated with processing large sets of data, reduce costs, and reduce reliance on data that may be perceived as private or otherwise sensitive.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As mentioned above, there is a need for a targeted advertisement technique that overcomes the technical challenges associated with processing large sets of data, reduce costs, and reduce reliance on data that may be perceived as private or otherwise sensitive.

The present disclosure provides a solution by generating an advertisement that is personalized based on digital data extracted from a user's digital media post. When the digital data indicates a need for a product or service, and certain thresholds are met, a personalized advertisement may be generated based on the digital media post and published, e.g., in relationship to the digital media post in real-time.

In an aspect of the disclosure, a method, a computer-readable medium, and an apparatus are provided. The apparatus may receive digital data associated with digital media communications. In certain aspects, the digital data may include textual data from the digital media communications. The apparatus may input the textual data into a natural language processing (NLP) model. The apparatus may obtain intent data associated with an item as an output of the NLP model. The apparatus may input the intent data into a tagging model. The apparatus may obtain an attribute tag as an output of the tagging model. In certain aspects, the attribute tag may indicate a set of attributes associated with the item. The apparatus may determine whether the intent data meets a likelihood threshold. The apparatus may determine whether the attribute tag meet a relevance threshold. The apparatus may output the intent data and the attribute tag to an external device upon determining that the intent data meets the likelihood threshold and that the attribute tag meets the relevance threshold.

In certain other implementations, the apparatus may receive, from an external device, intent data and an attribute tag associated with an item. In certain aspects, the intent data and the attribute tag may be related to digital data extracted from digital media communications on at least one digital media platform. The apparatus may generate an advertisement based at least in part on the intent data and the attribute tag. The apparatus may publish the advertisement in a location relative to the digital media communications on the digital media platform.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A-5C are a diagram illustrating a data flow between devices within the example operating environment in accordance with certain aspects of the disclosure.

DETAILED DESCRIPTION

Figure 1:
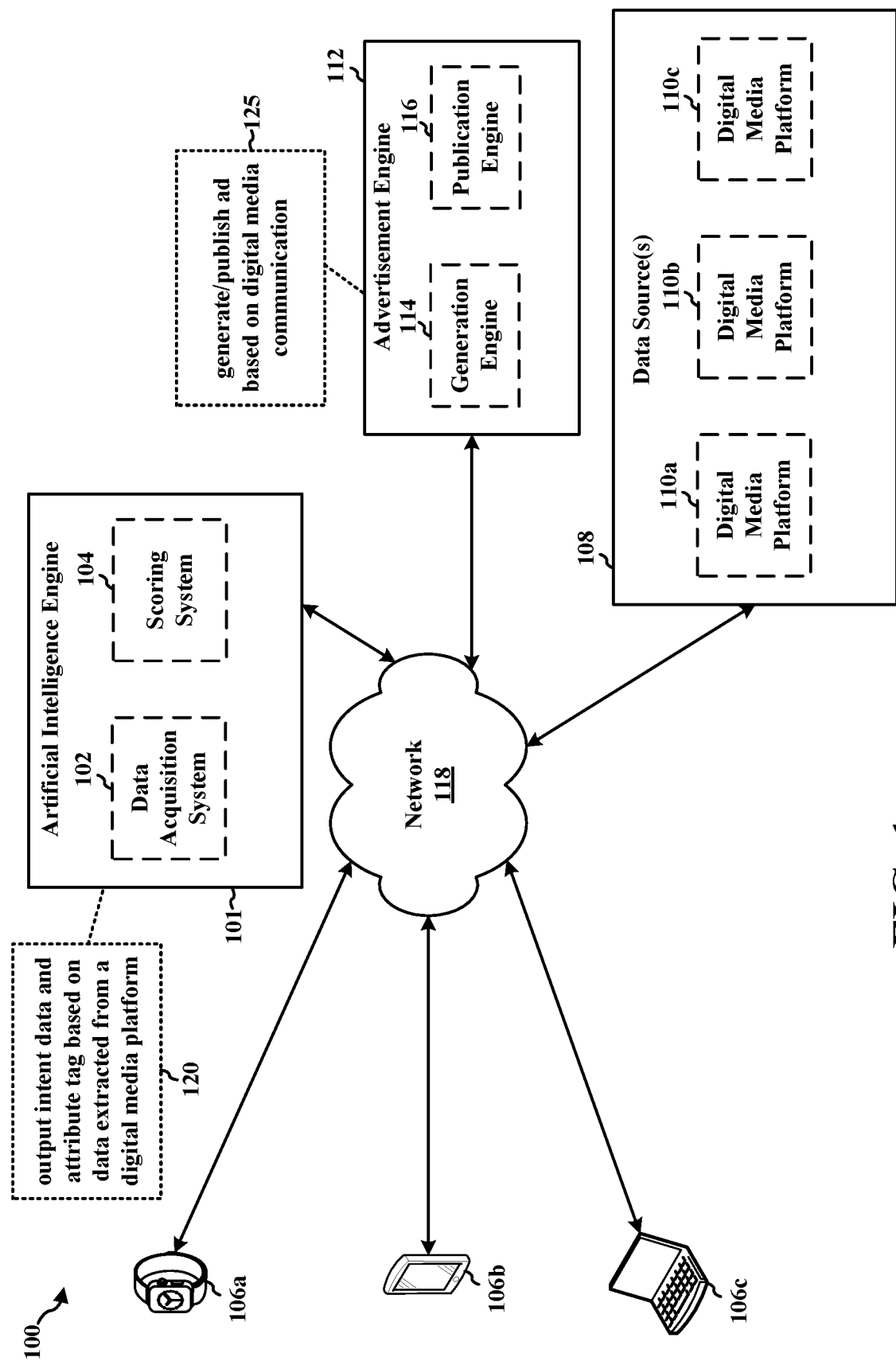
FIG. 1 is a diagram illustrating an example operating environment in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As previously mentioned, digital media advertisers today use significant amount of digital data to target advertisements to prospects who may be interested in purchasing a product or a service offering. Specifically, digital media advertisers may use demographic, behavior, and social networking data from digital media platforms and social media networks to identify users who may find a particular advertisement relevant.

Although these methodologies tend to be more targeted than the methodologies of the past, such as advertising in a phone book or on a billboard, the current technology still suffers from an inherent problem: advertisers are still targeting prospects based on one or more inferences about the likelihood that a prospect may purchase a product or a service offering. As a result, today's ad targeting technologies, although better, are still effectively guessing as to a prospect's desires. Therefore, today's ad targeting technologies are not very effective at placing the right advertisements in front of the right prospects at the right time (at the time that a decision to make a purchase is manifested).

The problems associated with current ad targeting technologies are exacerbated by the technical difficulties in processing digital data to gain intelligence from it. Indeed, to be effective, today's ad targeting systems must classify and analyze massive amounts of varied digital data including a user's behavior data, such as site visits, emails received and opened, etc., social networking data, such as likes, connections to people or pages, follows, etc., and demographic data related to the user and the user's cohort. Moreover, these systems also require access to significant amount of storage that must be accessed quickly to make real-time or near real-time decision about whether to serve an advertisement to a user.

Even if the significant technical challenges are overcome, the costs associated with making ad targeting decisions are often prohibitively high. For example, an advertiser who wants to target his or her ads to a particular type of user must typically employ data scientists to create complex analysis and insights systems. Once created, these systems must continually be reevaluated by data scientists for effectiveness in light of changing data and changing consumer sentiments. Moreover, the computing costs associated with making targeting decisions are also going up. Although computing systems to run complex machine learning and artificial intelligence systems may be rented today, it is still very expensive to create prediction models and use the models to make predictions because computing system vendors often charge per prediction or per hour of compute time. Finally, the cost of advertising on various digital platforms, such as various social media channels, have gone up significantly in recent years due to the increasing popularity of these channels and the large number of users who frequent these digital communities. All of these trends have caused targeted advertisements to become more expensive, thereby leading to a lower return on investment.

In addition to the significant technical challenges and related expenses, the current social and regulatory environment represents another significant challenge to effectively target prospects for digital advertisements. In today's environment, users and digital media platforms are increasingly becoming more sensitive to the use of demographic and/or behavior data by advertisers. As a result, many individual users, and digital media platforms have restricted access to data that used to be readily available to advertisers. Moreover, governments and regulators are increasingly passing rules and regulations that restrict the type of data that advertisers may have access to. Thus, advertisers having less data to make inferences about the likelihood that a user will purchase a product or a service offering, thereby reducing the effectiveness of advertisements in these channels.

What is needed is a new and a more effective way to target prospects for advertisements or offerings. Moreover, in order to be successful in today's environment, the new technology must overcome many of the technical challenges associated with processing large sets of data, reduce costs, and reduce reliance on data that may be perceived as private or otherwise sensitive.

The present disclosure provides a solution by generating an advertisement that is personalized based on digital data extracted from a user's digital media post. When the digital data indicates a need for a product or service, and certain thresholds are met, a personalized advertisement may be generated based on the digital media post and published, e.g., in relationship to the digital media post in real-time, e.g., using the techniques described below in connection with any of FIGS. 1-11.

Several aspects of personalized advertisement systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example configurations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates a block diagram of an example operating environment 100 in accordance with certain aspects of the disclosure. As seen in FIG. 1, the example operating environment 100 may include an artificial intelligence (AI) engine 101, a set of feedback devices 106a, 106b, 106c, at least one data source 108, an advertisement engine 112, and a network 118. The AI engine 101, each of the feedback devices 106a, 106b, 106c, the data source 108, and the advertisement engine 112 may be connected via a network 118 capable of transporting messages between devices within the example operating environment 100. In certain configurations, a subscribed user may use a feedback device 106a, 106b, 106c to access the of the AI engine 101 and/or the advertisement engine 112 via the network 118.

Each of the AI engine 101, the feedback devices 106a, 106b, 106c, data source 108, and the advertisement engine 112 may include suitable logic, circuitry, interfaces, processors, and/or code that may be used for communications between devices within the example operating environment 100 via the network 118. For example, communications within the example operating environment 100 may be implemented using a wireless communication protocol (e.g., FlashLinQ, WiMedia, Bluetooth®, ZigBee®, Wi-Fi based on the IEEE 802.11 standard, Long-Term Evolution (LTE), or 5G New Radio (NR), narrowband internet-of-things (NB IoT), etc.), a mix of different wireless communication protocols, an internet protocol, a wired communication protocol, or any combination thereof. In certain configurations, the network 118 may comprise any one or combination of a wired network, a wireless wide area network (WWAN), a wireless local area network (WLAN), or a wireless personal area network (WPAN). In certain configurations, at least a portion of the network 118 may be private. In certain other configurations, at least a portion of the network 118 may be public, e.g., such as the Internet.

Referring to the AI engine 101, a data acquisition system 102 and a scoring system 104 may be included therein. Each of the data acquisition system 102 and the scoring system 104 may include at least one computing device, e.g., such as the computing device 200 described below in connection with FIG. 2. The data acquisition system 102 may obtain digital media communications (e.g., posts, comments, threads, replies, tweets, images, videos, memes, likes, etc.) from the data source 108. In an example configuration, the data acquisition system 102 may use an application programming interface (API) to obtain the digital media communications by screen scraping digital media communications from the data source 108. For example, the data acquisition system 102 may use the API to continuously scan digital media communications and extract digital data using screen scraping upon detecting a new digital media communication associated with a particular user or set of users.

The data acquisition system 102 may provide the retrieved digital media communications to the scoring system 104 and/or one or more of the feedback devices 106a, 106b, 106c. Additional details associated with an AI engine, a data acquisition system, and a scoring system are described below in connection with FIG. 3.

Each of the feedback devices 106a, 106b, 106c may include at least one computing device, e.g., such as the computing device 200 described below in connection with FIG. 2. By way of example, a feedback device may include a cellular phone, a smart phone, a laptop, a personal digital assistant (PDA), a multimedia device, a video device, a digital audio player (e.g., MP3 player), a camera, a game console, a tablet, a smart device, a wearable device, a vehicle, an IoT device, or any other similar functioning device. A business that subscribes to the services of the AI engine 101 may interact with the scoring system 104 via one or more of the feedback devices 106a, 106b, 106c.

Data source 108 may comprise one or more digital media platforms 110a, 110b, 110c, websites, web applications, mobile applications, digital media platforms, digital message boards, and digital review collection systems. Data source 108 may include applications executing on one or more computing devices, e.g., such as the computing device 200 described below in connection with FIG. 2. In certain configurations, data source 108 may be a distributed network (not shown) including one or more servers, one or more client devices, and one or more application programming interfaces (APIs). The data acquisition system 102 may use the one or more APIs to obtain (e.g., retrieve, extract, receive, etc.) digital data from digital media communications located, e.g., on at least one of the digital media platforms 110a, 110b, 110c of the data source 108.

In certain aspects, the AI engine 101 may be configured to output (e.g., to at least one of the feedback devices 106a, 106b, 106c and/or the advertisement engine 112) intent data and an attribute tag extracted from a digital media communication (120), e.g., as described below in connection with any of FIGS. 2-11. In certain other aspects, the advertisement engine 112 may be configured to generate and/or publish an advertisement based on the intent data and attribute tag received from the AI engine 101 (125), e.g., as described below in connection with any of FIGS. 2-11.

Figure 2:
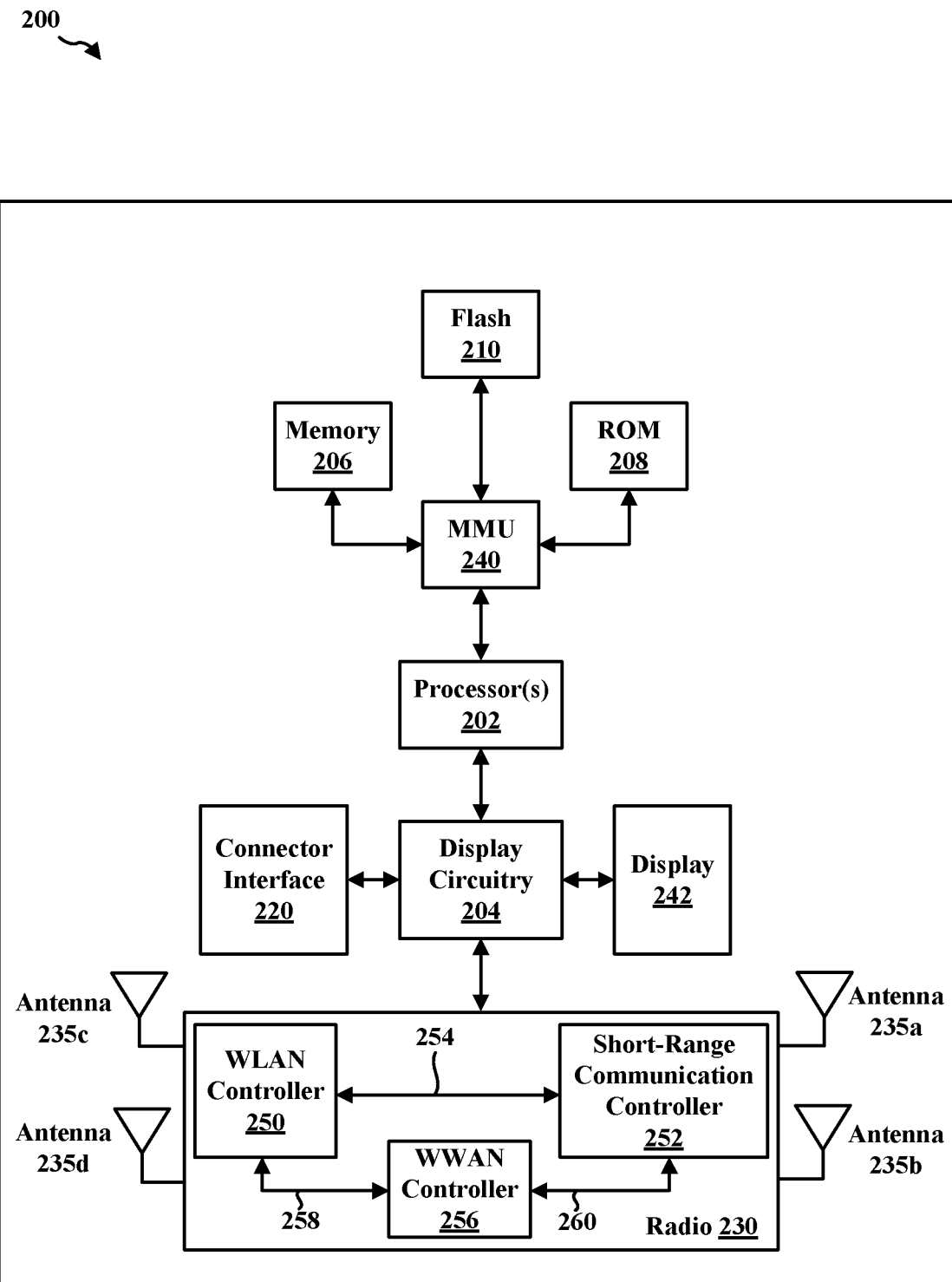
FIG. 2 is block diagram of a computing device in accordance with certain aspects of the disclosure.

FIG. 2 is block diagram of a computing device 200 in accordance with certain aspects of the disclosure. The computing device 200 may correspond to, e.g., the AI engine 101, the data acquisition system 102, the scoring system 104, the feedback device 106a, 106b, 106c, the data source 108, the digital media platform 110a, 110b, 110c, the advertisement engine 112, the advertisement generation engine 114, and/or the advertisement publication engine 116.

As shown in FIG. 2, the computing device 200 may include a processing element, such as processor(s) 202, which may execute program instructions for the computing device 200. The computing device 200 may also include display circuitry 204 which may perform graphics processing and provide display signals to the display 242. The processor(s) 202 may also be coupled to memory management unit (MMU) 240, which may be configured to receive addresses from the processor(s) 202 and translate the addresses to address locations in memory (e.g., memory 206, ROM 208, Flash memory 210) and/or to address locations in other circuits or devices, such as the display circuitry 204, radio 230, connector interface 220, and/or display 242. The MMU 240 may be configured to perform memory protection and page table translation or set up. In some configurations, the MMU 240 may be included as a portion of the processor(s) 202.

As shown, the processor(s) 202 may be coupled to various other circuits of the computing device 200. For example, the computing device 200 may include various types of memory, a connector interface 220 (e.g., for coupling to the computer system), the display 242, and wireless communication circuitry (e.g., for Wi-Fi, Bluetooth®, Bluetooth Low Energy®, cellular, etc.). The computing device 200 may include a plurality of antennas 235a, 235b, 235c, 235d, for performing wireless communication with, e.g., another device in the example operating system 100 described above in FIG. 1.

In certain aspects, the computing device 200 may include hardware and software components (a processing element) configured to output intent data and an attribute tag extracted from a digital media communication, e.g., using the techniques described below in connection with any FIGS. 3-11. In certain other aspects, the computing device 200 may include hardware and software components (a processing element) configured to generate and/or publish an advertisement based on the intent data and attribute tag received from an AI engine, e.g., using the techniques described below in connection with any FIGS. 3-11.

The computing device 200 may be configured to implement part or all of the techniques described below in connection with any of FIGS. 3-11, e.g., by executing program instructions stored on a memory medium (e.g., a non-transitory computer-readable memory medium) and/or through hardware or firmware operation. In other configurations, the techniques described below in connection with any of FIGS. 3-11 may be at least partially implemented by a programmable hardware element, such as a field programmable gate array (FPGA), and/or an application specific integrated circuit (ASIC).

In certain aspects, radio 230 may include separate controllers configured to control communications for various respective radio access technology (RAT) protocols. For example, as shown in FIG. 2, radio 230 may include a WLAN controller 250 configured to control WLAN communications, a short-range communication controller 252 configured to control short-range communications, and a WWAN controller 256 configured to control WWAN communications. In certain aspects, the computing device 200 may store and execute a WLAN software driver for controlling WLAN operations performed by the WLAN controller 250, a short-range communication software driver for controlling short-range communication operations performed by the short-range communication controller 252, and/or a WWAN software driver for controlling WWAN operations performed by the WWAN controller 256.

In certain implementations, a first coexistence interface 254 (e.g., a wired interface) may be used for sending information between the WLAN controller 250 and the short-range communication controller 252. In certain other implementations, a second coexistence interface 258 may be used for sending information between the WLAN controller 250 and the WWAN controller 256. In certain other implementations, a third coexistence interface 260 may be used for sending information between the short-range communication controller 252 and the WWAN controller 256.

In some aspects, one or more of the WLAN controller 250, the short-range communication controller 252, and/or the WWAN controller 256 may be implemented as hardware, software, firmware or some combination thereof.

In certain configurations, the WLAN controller 250 may be configured to communicate with a second device in a network (e.g., example operating network 100) using a WLAN link using all of the antennas 235a, 235b, 235c, 235d. In certain other configurations, the short-range communication controller 252 may be configured to communicate with at least one second device in a network (e.g., example operating network 100) using one or more of the antennas 235a, 235b, 235c, 235d. In certain other configurations, the WWAN controller 256 may be configured to communicate with a second device in a network (e.g., example operating network 100) using all of the antennas 235a, 235b, 235c, 235d.

Figure 3:
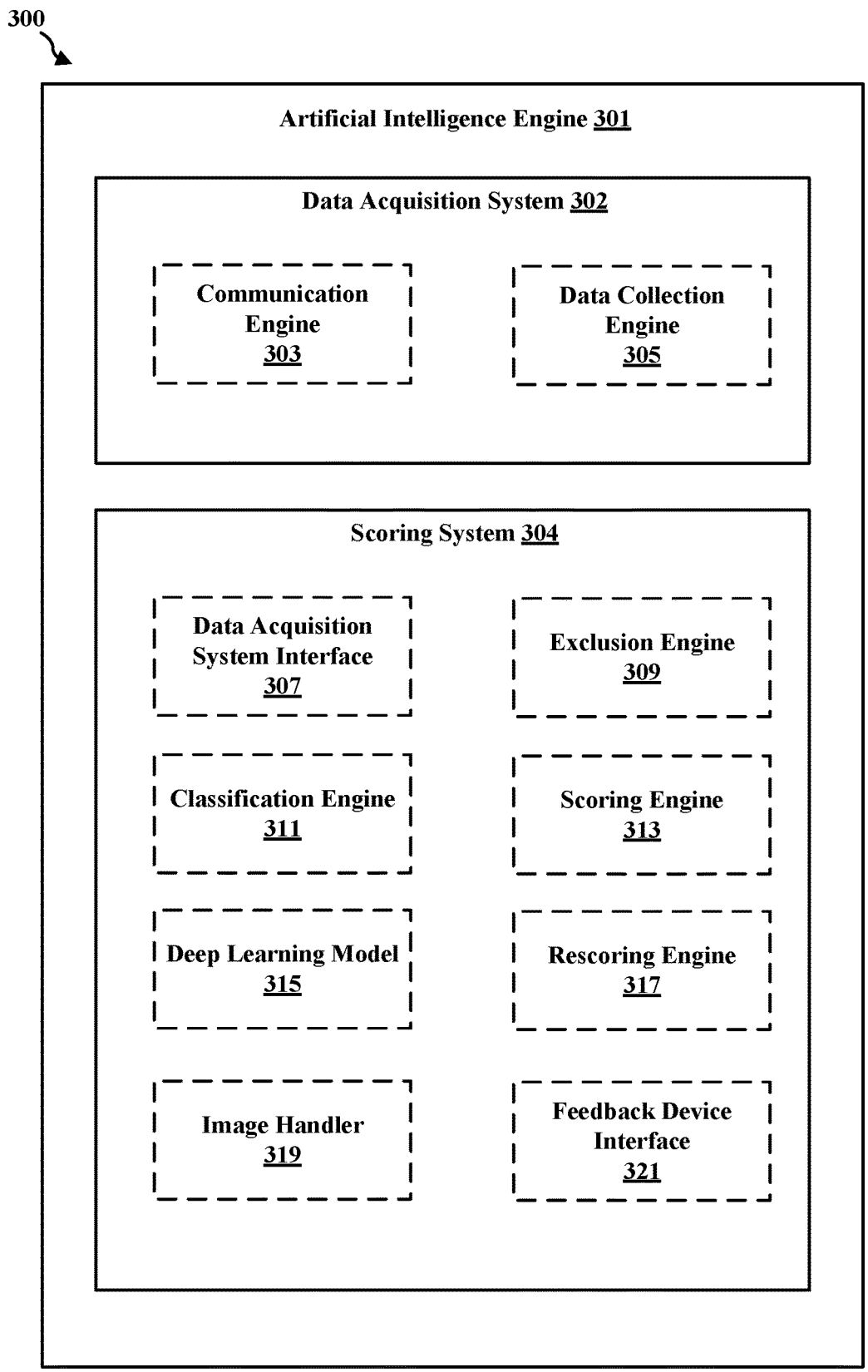
FIG. 3 is a diagram illustrating an example artificial intelligence (AI) engine in accordance with certain aspects of the disclosure.

FIG. 3 illustrates a block diagram 300 representing an exemplary AI engine 301 that includes a data acquisition system 302 and a scoring system 304 in accordance with certain aspects of the present disclosure. The AI engine 301 may correspond to, e.g., AI engine 101, 401, 502, 1050, computing device 200, the apparatus 702/702'.

The example scoring system 304 may comprise a data acquisition system interface 307, an exclusion engine 309, a classification engine 311, a scoring engine 313, a deep learning model 315, a rescoring engine 317, an image handler 319, and a feedback device interface 321.

The data acquisition system interface 307 may include at least one computing device, e.g., such as the computing device 200 described below in connection with FIG. 2. The data acquisition system interface 307 may receive digital media communications from the data acquisition system 302. The data acquisition system interface 307 may receive multiple digital media communications, where a dataset, such as a training dataset, comprises the multiple digital media communications. The data acquisition system interface 307 may receive a single digital media communication. A digital media communication may comprise a post, a comment, an entry in a thread, a reply, a tweet, an image, a meme, etc. A digital media communication may comprise content from a questionnaire, a web form, a web search, a web scrapping, etc.

The exclusion engine 309 may include at least one computing device, e.g., such as the computing device 200 described below in connection with FIG. 2. The exclusion engine 309 may exclude digital media communications based on one or more library of words, phrases, emoticons, etc. The one or more libraries may be provided, user-defined, or both. The exclusion engine 309 may filter all communications. For example, a library may comprise words, such as profanity, that would indicate a respective digital media communication is not appropriate to present as a sales lead. The exclusion engine 309 may filter communications with respect to an industry. For example, a library associated with automotive dealerships may indicate that digital media communications with the phrase "baseball card" should be excluded, so as to reduce false hits from digital media communications seeking baseball card dealers. The exclusion engine 309 may filter communications with respect to a particular client. For example, a library associated with a business in Dallas, Ga. may exclude digital media communications with the word "Texas."

The classification engine 311 may include at least one computing device, e.g., such as the computing device 200 described below in connection with FIG. 2. The classification engine 311 may classify the digital media communications into one or more industries based on one or more libraries of words, phrases, emoticons, etc. The one or more libraries may be provided, user-defined, or both. For example, the classification engine 311 may classify digital media communications as relevant to real estate, health insurance, auto insurance, banking, etc. The classification engine 311 may classify the digital media communications based on North American Industry Classification System (NAICS) codes. The classification engine 311 may classify the digital media communications into NAICS codes. The classification engine 311 may learn new words and/or phrases for respective industries through machine learning.

The scoring engine 313 may include at least one computing device, e.g., such as the computing device 200 described below in connection with FIG. 2. The scoring engine 313 may assign a score to each of the digital media communications, wherein the score may indicate a willingness of an author of a respective digital media communication to buy a product and/or service. The scoring engine 313 may use deep learning to determine a context in a digital media communication, and determine whether an originator of the digital media communication has a need, is looking for a product or service or recommendation, or even looking to purchase immediately. The scoring engine 313 may score a digital media communication on a general intent to purchase any product and/or service. For example, if a digital media communication comprises the phrase "I am looking to buy", then the digital media communication may receive a high, non-industry specific score. The scoring engine 313 may score a digital media communication on an intent to purchase an industry specific product and/or service. For example, if a digital media communication comprises the phrase "I am looking for a real estate agent", then the digital media communication may receive a high, industry specific (real estate) score.

The deep learning model 315 may include at least one computing device, e.g., such as the computing device 200 described below in connection with FIG. 2. The deep learning model 315 may be trained using an initial training dataset of digital media communications. The deep learning model 315 may update other portions of the scoring system 304, such as the exclusion engine 309, the classification engine 311, the scoring engine 313, rescoring engine 317, the image handler 319, etc.

The feedback device interface 321 may include at least one computing device, e.g., such as the computing device 200 described below in connection with FIG. 2. The feedback device interface 321 may comprise a mobile application. The feedback device interface 321 may comprise a web application. The feedback device interface 321 may allow the scoring system 304 to communicate with, e.g., one or more of the feedback devices 106*a*, 106*b*, 106*c* in FIG. 1. The scoring system 304 may receive one or more library entries specified by a user via the feedback device interface 321. The scoring system 304 may deliver digital media communications to the user via the feedback device interface 321. The scoring system 304 may receive feedback from the user regarding the digital media communications via the feedback device interface 321.

The rescoring engine 317 may include at least one computing device, e.g., such as the computing device 200 described below in connection with FIG. 2. The rescoring engine 317 may rescore the digital media communications based on the feedback received via the feedback device interface 321. The rescoring engine 317 may update the deep learning model 315 based on the rescoring. In addition, the rescoring engine 317 may also update the exclusion engine 309 as described in greater detail below.

The rescoring engine 317 may comprise and/or be in communication with a natural language processing (NLP) model, e.g., such as the ML NLP model 450, the LE NLP model 455, auto response model 460, 465 in FIG. 4 and/or NLP model component 708 described below in connection with FIG. 7. The NLP model may include at least one computing device, e.g., such as the computing device 200 described below in connection with FIG. 2. The NLP model may assign a score based on text in a digital media communication. The assigned score may indicate an intent of an author of the digital media communication to buy a product and/or service. The rescoring engine 317 may rescore a digital media communication based, at least in part, on an assigned score of the NLP model.

The image handler 319 may include at least one computing device, e.g., such as the computing device 200 described below in connection with FIG. 2. The image handler 319 may determine if a digital media communication comprises an image. If the digital media communication does not comprise an image, then the image handler 319 may not do anything in relationship to the digital media communication. If the digital media communication comprises an image, then the image handler 319 may compare the image with a set of trained images to determine an image relevance. The set of trained images may comprise multiple image sets based on industry. The image handler 319 may assign a score based, at least in part, on the determined image relevance. The image handler 319 may assign a score based on a combination of the image relevance and text in the digital media communication. The rescoring engine 317 may comprise and/or be in communication with the image handler 319. The rescoring engine 317 may rescore a digital media communication based, at least in part, on an assigned score of the image handler 319. In one non-limiting example, the image handler 319 may be trained to identify images containing a 2017 model of Honda Accord. Once identified, the results may be passed on to the rest of the system. In certain configurations, if the digital media posts contain the words "going to buy my dream car this weekend" then the system may act on that information as containing a high buying intent in accordance with the disclosure herein. In certain other configurations, the image hander 319 may be used solely to identify a buying intent and communicate with prospects in accordance with the disclosure herein.

The rescoring engine 317 may comprise and/or be in communication with a sentiment model. The sentiment model may include at least one computing device, e.g., such as the computing device 200 described below in connection with FIG. 2. The sentiment model may determine likes and/or dislikes about a particular product and/or service. The sentiment model may be used to determine an appropriate offering incentive for an author of a particular digital media communication. The sentiment model may assign a score to a digital media communication based on a sentiment about a product and/or service. The rescoring engine 317 may rescore a digital media communication based, at least in part, on an assigned score of the sentiment model.

The rescoring engine 317, NLP model, image handler 319, sentiment model, and feedback device interface 321 may form a feedback loop. Digital media communication received via the data acquisition system interface 307 and scored via the scoring engine 313 may be rescored via the feedback loop.

Digital media communications that are scored and/or rescored above a threshold may be passed on to one or more relevant product and/or service providers (e.g., marketers, clients, etc.). Publicly available information about a contact (e.g., author, originator, etc.) associated with the digital media communications may be provided to the one or more relevant product and/or service providers. The digital media communications may be provided to the one or more relevant advertisers, product and/or service providers via the feedback device interface 321. The digital media communications may also be provided to the one or more relevant advertisers, product and/or service providers via a mobile application. The digital media communications may be provided to the one or more relevant advertisers, product and/or service providers via a web application. The one or more relevant advertisers, product and/or service providers may receive a prompt to send a pitch via a digital media communications. The pitch may comprise a communication regarding a product and/or service. The pitch may comprise an offering incentive for a product and/or service. The pitch may comprise an advertisement for a product and/or service.

For example, an automotive dealership may comprise an account with the scoring system 304. A user associated with the automotive dealership may create two libraries of keywords. A first library, associated with the exclusion engine 309, may comprise words, phrases, emojis, etc., which indicate a digital media communication should be excluded if the words, phrases, emojis, etc. of the first library are found in the digital media communication. For example, the user associated with the automotive dealership may indicate that "baseball card" should be in a library associated with the exclusion engine 309.

A second library, associated with the classification engine 311, may comprise words, phrases, emojis, etc., which indicate a digital media communication should be included if the digital media communication comprises anything found in the second library. In certain configurations, the scoring engine 313 may use the second library. In certain other configurations, one or more portions of the feedback loop, such as the rescoring engine 317, may use the second library. As an example, the automotive dealership may indicate that "dealership" should be in the second library.

The data acquisition system 302 may retrieve posts from a digital social media platform from an API associated with the digital social media platform. The posts may form a training dataset. A first post of the training dataset, for example, may read: "I'm looking for a baseball card dealership in San Antonio." A second post of the training dataset, for example, may read: "Can someone recommend a dealership?". A third post of the training dataset, for example, may read: "Thanks to Jessica for recommending Pegassi of San Andreas. Best experience with a car dealership."

The data acquisition system 302 may provide the training dataset to the scoring system 304 via the network 118. The scoring system 304 may receive the training dataset via the data acquisition system interface 307. The scoring system 304 may give the training dataset an initial score. For example, the exclusion engine 309 may exclude the first post from the training dataset on the basis of the appearance of the phrase "baseball card". As another example, any posts that include vulgarity may be excluded from all training datasets. As another example, the classification engine 311 may classify the second post and the third post being relevant to the automotive dealership on the basis of the appearance of the word "dealership". As another example, the scoring engine 313 may give the second post and the third post scores indicating a high likelihood of intent to buy from the automotive dealership on the basis of the appearance of the words "recommend/recommending" and "dealership".

The scoring system 304 may provide the training dataset to one or more of the feedback devices 106a, 106b, 106c in FIG. 1 via the feedback device interface 321. For example, the user associated with the automotive dealership may receive the training dataset at one or more of the feedback devices 106a, 106b, 106c illustrated in FIG. 1. The scoring system 304 may receive feedback from one or more of the feedback devices 106a, 106b, 106c illustrated in FIG. 1 via the feedback device interface 321. For example, the user associated with the automotive dealership may give feedback indicating that the second post indicates a high likelihood of intent to buy from the automotive dealership, but the third post indicates a low likelihood of intent to buy from the automotive dealership.

The rescoring engine 317 may rescore the training dataset based on the feedback. For example, the rescoring engine 317 may rescore the second post with the same score. As another example, the rescoring engine 317 may rescore the third post with a lower score based on the feedback.

The rescoring engine 317 may update the deep learning model 315 based on the rescoring. For example, the deep learning model 315 may learn that if another automotive dealership is mentioned in a post, a likelihood of intent to buy from the automotive dealership is decreased based on the rescoring of the third post. As another example, the deep learning model 315 may learn that if gratitude towards a particular person is expressed in a post, a likelihood of intent to buy from the automotive dealership is decreased based on the rescoring of the third post. As another example, the deep learning model 315 may learn that if "recommend" and "dealership" do not appear in the same sentence, a likelihood of intent to buy from the automotive dealership is decreased based on the rescoring of the third post. As another example, the deep learning model 315 may learn that if another automotive dealership is not mentioned, if gratitude towards a particular person is not expressed, and if "recommend" and "dealership" appear in the same sentence, confidence in a high likelihood of intent to buy from the automotive dealership is increased based on the rescoring of the second and the third post.

The scoring system 304 may receive additional posts from the data acquisition system 106 via the data acquisition system interface 307. The additional posts may be scored by the scoring engine 313. Any of the additional posts that receive a score above a threshold may be provided to, e.g., one or more of the feedback devices 106a, 106b, 106c illustrated in FIG. 1 via the feedback device interface 321. The scoring system 304 may receive feedback from, e.g., one or more of the feedback devices 106a, 106b, 106c illustrated in FIG. 1 regarding the provided additional posts. The rescoring engine 317 may use the feedback to rescore the additional posts. The deep learning model 315 may be updated based on the rescoring of the additional posts.

For example, the data acquisition system 106 may retrieve an additional post that reads "That's the last time I ask someone here to recommend an automotive dealership for me!". The scoring system 304 may receive the additional post from the data acquisition system 106 via the data acquisition system 307. The scoring engine 313 may give the additional post a score that indicates a high likelihood of intent to buy from the automotive dealership. The additional post may be provided to, e.g., one or more of the feedback devices 106a, 106b, 106c illustrated in FIG. 1 via the feedback device interface 321. The user associated with the automotive dealership may give input that indicates that an author of the additional post has a low likelihood of intent to buy from the automotive dealership. The scoring system 304 may receive the user input for the additional post via the feedback interface 321. The rescoring engine 317 may rescore the additional post based on the user input. The deep learning model 315 may be updated based on the rescoring the additional post. For example, the deep learning model 315 may recognize that the phrase "That's the last time" indicates a negative sentiment.

Every time the user of the automotive dealership is presented with a digital media communication, the user may give feedback (e.g., input, etc.) on the presented digital media communication. The user feedback creates a feedback loop, which may constantly improve the deep learning model 315, which, in turn, may improve other aspects of the scoring system 304, such as the scoring engine 313, the rescoring engine 317, the classification engine 311, etc.

Figure 4:
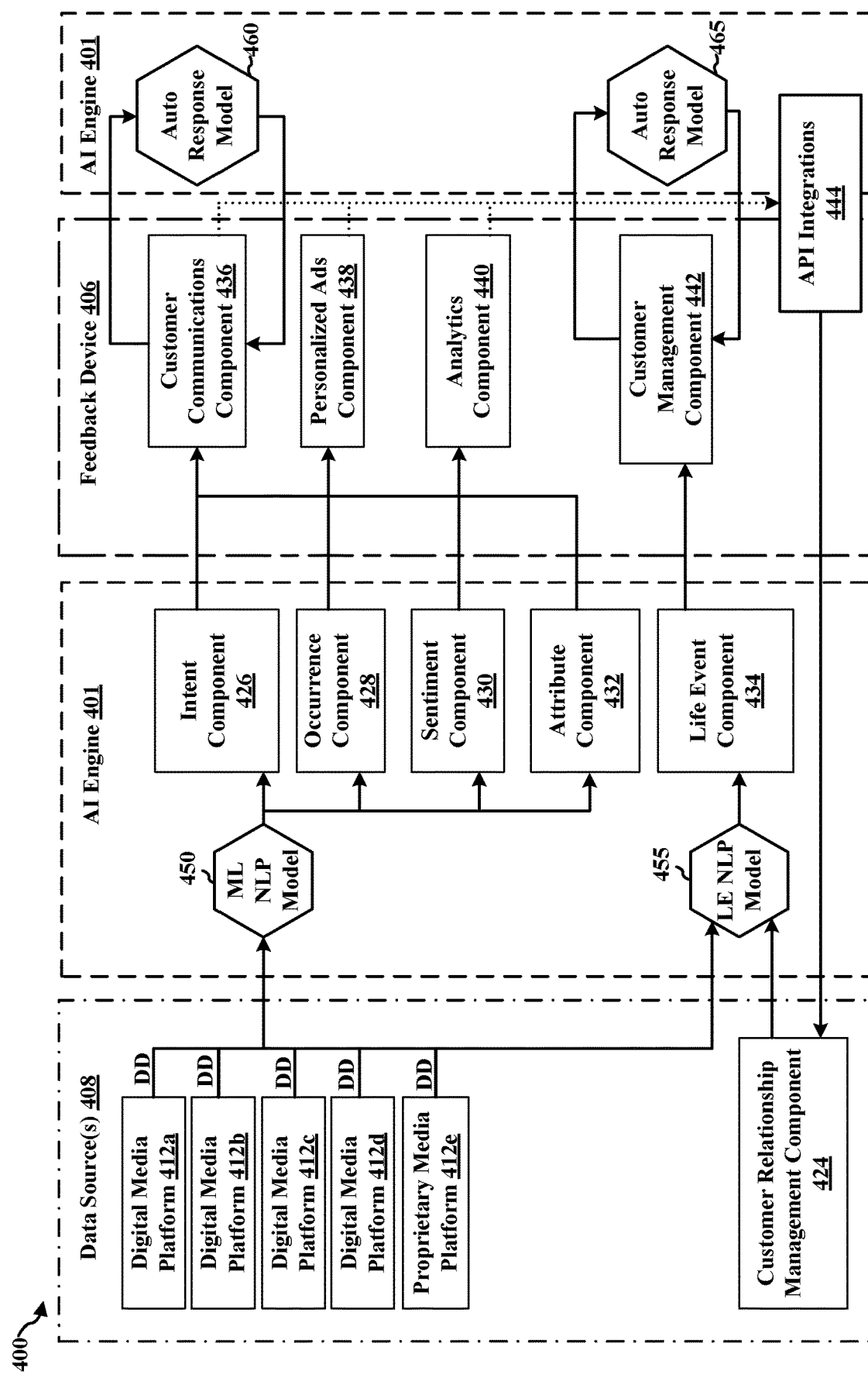
FIG. 4 is a diagram illustrating a detailed view of the example operating environment in accordance with certain aspects of the disclosure.

FIG. 4 illustrates a block diagram of an example operating environment 400 in accordance with certain aspects of the disclosure. As seen in FIG. 4, the example operating environment 400 may include an AI engine 401, a feedback device 406, and a data source 408 that may communicate with one another via a network, e.g., such as the network 118 described above in connection with FIG. 1. The AI engine 401 may correspond to, e.g., AI engine 101, 301, 502, 1050, computing device 200, the apparatus 702/702'. The feedback device 406 may correspond to, e.g., feedback device 106a, 106b, 106c, 504, the computing device 200, external device 755. The data source 408 may correspond to, e.g., data source 108, 506, 750, 1055, the computing device 200.

Referring to FIG. 4, the AI engine 401 may include, e.g., an intent component 426, an occurrence component 428, a sentiment component 430, an attribute component 432, a life event component 434, a machine learning (ML) NLP model 450, a life event (LE) NLP model 455, a first auto response model 460, a second auto response model 465, and API integrations associated with the feedback device 406. The feedback device 406 may include, e.g., a customer communication component 436, a personalized advertisement (Ads) component 438, an analytics component 440, a customer management component 442, and API integrations 444 associated with the AI engine 401. The data source 408 may include, e.g., a set of digital media platforms 412a, 412b, 412c, 412d, at least one proprietary media platform 412e, and a customer relationship management component 424.

In certain configurations, the feedback device 406 may be associated with a business that provides goods and/or services to a customer. The business associated with the feedback device 406 may subscribe to the services of the AI engine 401. In order to receive personally tailored advertisements from the business, a customer may grant the business access to the customer's digital media accounts across different digital media platforms 412a-412e (e.g., Twitter®, Facebook®, Instagram®, Reddit®, Online Forums, and/or a proprietary channel associated with FunnelAI®). Credentials associated with the customer's digital media accounts may be provided to the feedback device 406.

The feedback device 406 may send the credentials to the customer relationship management component 424. The customer management component 424 may maintain the credentials, which may be access by the AI engine 401 via a network, e.g., such as the network 118 described above in connection with FIG. 1. In certain other implementations, the feedback device 406 may send the credentials directly to the AI engine 401.

Using the credentials provided by the feedback device 406 or accessed from the customer relationship management component 424, the AI engine 401 may obtain, retrieve, and/or extract digital data associated with the customer's digital media posts on the digital media platforms 412a, 412b, 412c, 412d, 412e. For example, when a customer posts a comment (e.g., textual data) or a picture (e.g., image data) on one of her digital media accounts, the AI engine 401 may extract digital data (DD) in the form of textual data and/or image data from the post. In certain configurations, the AI engine 401 may continuously scan for new posts by the customer. Upon detecting a new post by the customer, the AI engine 401 may extract any textual data and/or image data in order to determine whether the user intends to purchase a good or service provided by the business.

The AI engine 401 may input the extracted digital data into the ML NLP model 450 and the LE NLP component 455. The ML NLP model 450 may apply a set of pre-identified intent keywords, a set of pre-defined intent images, and/or a deep learning algorithm to the digital data in order to determine the context of the customer's digital media post. For example, the ML NLP model 450 may also determine (e.g., intent data) whether the context of the post suggests a purchase intent, a need for an item or a service, whether the need is immediate, and/or whether the post is requesting a recommendation (e.g., from the digital media community) for an item and/or service. The ML NLP model 450 may output intent data to at least one of the intent component 426, the occurrence component 428, the sentiment component 430, and the attribute component 432. The AI engine 401 may include a tagging model that is made up of the intent component 426, the occurrence component 428, the sentiment component 430, and the attribute component 432.

The intent component 426 may apply a set of pre-identified purchase intent keywords, a set of pre-defined purchase intent images, and/or a deep learning algorithm to the intent data in order to categorize the customer's likelihood of purchasing a good or service, e.g., as either "High," "Medium," or "Low." In certain configurations, the intent component 426 may output a likelihood tag (e.g., "High," "Medium," or "Low") indicating the likelihood of purchase.

The occurrence component 428 may apply a set of pre-identified occurrence keywords, a set of pre-defined occurrence images, and/or a deep learning algorithm to the intent data in order to determine whether the customer may be in need of an item or service based on an "occurrence," e.g., such as a car collision, dents to car doors, bringing a car to a salvage yard, or donating a car to a charity. The occurrence component 428 may output occurrence data indicating whether the customer has experienced an occurrence which may indicate a need for an item or service.

The sentiment component 430 may apply a set of pre-identified sentiment keywords, a set of pre-defined sentiment images, and/or a deep learning algorithm to the intent data in order to determine whether the digital data extracted from customer's digital media post includes a product review or a service review. The sentiment component 430 may output sentiment data indicating a sentiment associated with a product and/or service.

The attribute component 432 may apply a set of pre-identified attribute keywords, a set of pre-defined attribute images, and/or a deep learning algorithm to the intent data in order to determine whether any attributes (e.g., color, brand, make, model, size, year) are mentioned in the customer's digital media post. The attribute component 432 may output an attribute tag indicating a set of attributes associated with a product or service.

In order to determine whether to output the intent data and/or the attribute tag to the feedback device 406, the AI engine 401 may determine whether the likelihood tag output by the intent component 426 meets a likelihood threshold and whether the attribute tag output by the attributes component 432 meets a relevance threshold.

By way of example, if the likelihood threshold is "Medium" and the likelihood tag is "Low," the AI engine 401 may determine that the likelihood threshold is not met, and hence, the intent data and attribute tag may not be output to the feedback device 406. Conversely, if the likelihood threshold is "Medium," the AI engine 401 may determine that the customer's likelihood of purchasing a good or service meets the likelihood threshold when the likelihood tag is either "Medium" or "High." Upon determining that the likelihood threshold is met, the AI engine 401 may determine whether the attribute tag meets the relevance threshold.

By way of example, assume that in a set of four attribute categories (e.g., "Make," "Model," "Year," and "Color") that each attribute category includes a set of three attributes, e.g., "Ford®/Chevy®/Toyota®" are the three attributes in the "Make" attribute category, "SUV/Truck/Sedan" are the three attributes in the "Model" attribute category, "2018/2019/2020" are the three attributes in the "Year" attribute category, and "White/Black/Silver" are the three attributes in the "Color" attribute category. Using the same example, the sales manager of a car dealership (e.g., the business associated with the feedback device 406) may set the relevance threshold such that one attribute from each of the "Make" and "Model" as well as an attribute from either the "Year" or "Color" category must be indicated by the attribute tag to meet the relevance threshold. In the present example, the relevance threshold may be set based on the inventory of vehicles available for sale at the car dealership. Hence, when the attribute tag indicates Ford®, SUV, and 2020, the relevance threshold of the present example is met. Conversely, when the attribute tag indicates Ford®, Compact, and 2020, the relevance threshold of the present example is not met.

In certain implementations, the user data may include least one of user credentials associated with a set of digital media platforms 412a, 412b, 412c, 412d, 412e, a digital media post identification (ID) associated with digital media post from which the digital data was extracted, or a purchase history associated with a user. The user data may also be input into the tagging model. The attribute tag may be obtained based at least in part on the user data. For example, the attribute tag may include a history tag (e.g., date, price, type of product, etc.) that indicates a purchase history between the customer and the business.

In certain implementations, at least one of the digital data, the user data, the intent data, and the attribute tag may be input into one or more of the customer communications component 436, the personalized ads component 438, and/or the analytics component 440 of the feedback device 406 upon determining that the likelihood threshold and the relevance threshold are both met. Additionally and/or alternatively, at least one of the digital data, intent data, and the attribute tag may be output to an advertisement engine, e.g., such as the advertisement engine 508 described below in connection with FIGS. 5A-5C. Otherwise, when at least one of the likelihood threshold or the relevance threshold is not met, the intent data and the attribute tag are not output to the feedback device 406.

Turning to the feedback device 406, the personalized ads component 438 may generate a digital advertisement that is tailored for the customer based on the digital data extracted from the customer's digital media post. In certain other implementations, the personalized ads component 438 may obtain a digital advertisement that is tailored for the customer based on the digital data extracted from the customer's digital media post from an advertisement engine, e.g., the advertisement engine 508 described below in connection with FIGS. 5A-5C.

In still other implementations, one or more of the personalized ads component 438 and/or the advertisement engine (e.g., advertisement engine 508) may send the personalized advertisement to one or more of the digital media platforms 412a, 412b, 412c, 412d, 412e for publishing in a digital advertisement space adjacent to the customer's digital media post on which the advertisement is based. In certain aspects, the personalized advertisement may be published in "real-time," meaning that the personalized advertisement may be published in the same login session in which the digital media post was uploaded by the customer.

In certain configurations, the customer communications component 436 may generate a personalized communication (e.g., email communication) for the customer based on one or more of the intent data and the attribute tag. Information associated with communications between the feedback device 406 and the customer that are related to the intent data, attribute tag, personalized communication, and/or personalized advertisement may be maintained at the customer communications component 436. The information associated with the communications may be input into the auto response model 460 at the AI engine 401. The auto response model 460 may update the ML NLP model 450 in order to update a set of keywords, images, and/or algorithms for a more accurate assessment of digital media posts as they relate to a business's advertising needs.

The analytics component 440 may analyze information in the intent data and the attribute tag to manage customer relationships.

Information associated with one or more of the intent data, the attribute tag, and/or the personalize advertisement may be sent to the API integrations 444 from one or more of the customer communications component 436, the personalized ads component 438, and/or the analytics component 440. The API integrations 444 may send this information to the customer relationship management component 424, which maintains information associated business transactions and/or communications between the customer and the business.

Referring to life event determinations at the AI engine 401, digital data obtained from the digital media post may be input into the LE NLP model 455 from the data source 408. The LE NLP model 455 may apply a set of pre-identified life event keywords, a set of pre-defined life event images, and/or a deep learning algorithm to the digital data to extract life event data from the digital media post when the digital media post includes life event data. The life event data may be input into the life event component 434 of the AI engine 401.

The life event component 434 may determine which type of life event (e.g., birthday, new born child, new house, graduation, job promotion, relocation, anniversary, etc.) is indicated by the life event data by comparing the life event data to a look-up table that correlates keywords and/or images to different categories of life events. The life event component 434 may select a life event when the life event data includes a predetermined number of matching keywords and/or images associated with a category. Information associated with the life event may be sent to the customer management component 442, which may generate a communication that is tailored based on the life event information and may be sent to the customer. For example, if the life event information indicates a child's graduation, the customer management component 442 may generate a life event communication that suggest a vehicle as a graduation gift, and the feedback device 406 may send the life event communication to the customer.

Information associated with the life event communication (e.g., a response from the customer, the amount of time the communication remains open in the customer's email account, etc.) may be input into the auto response model 465 at the AI engine 401. The auto response model 465 may update the ML NLP model 450 in order to update a set of keywords, images, and/or algorithms for a more accurate assessment of digital media posts as they relate to a business's advertising needs.

Figure 5A:
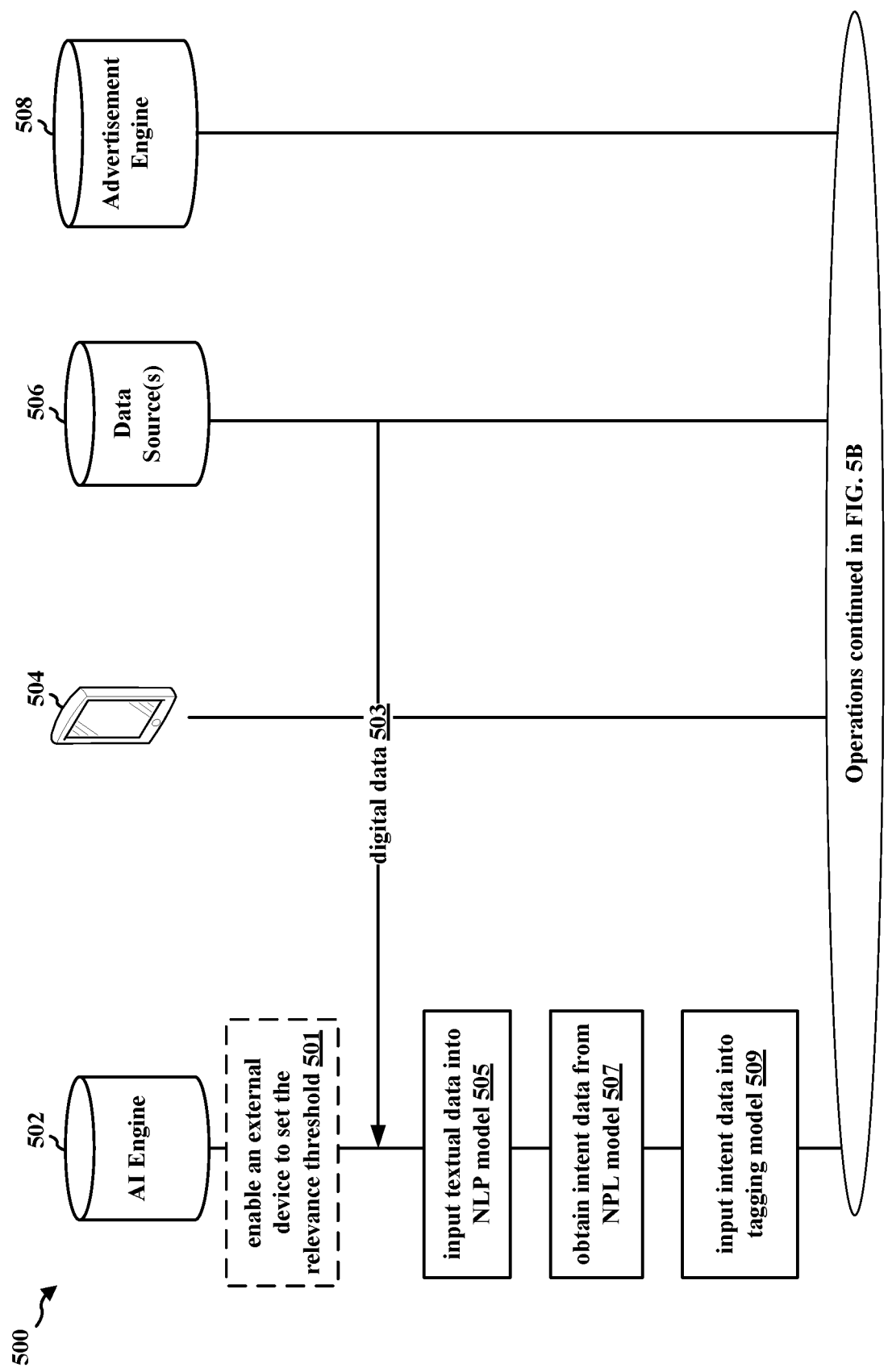
Figure 5B:
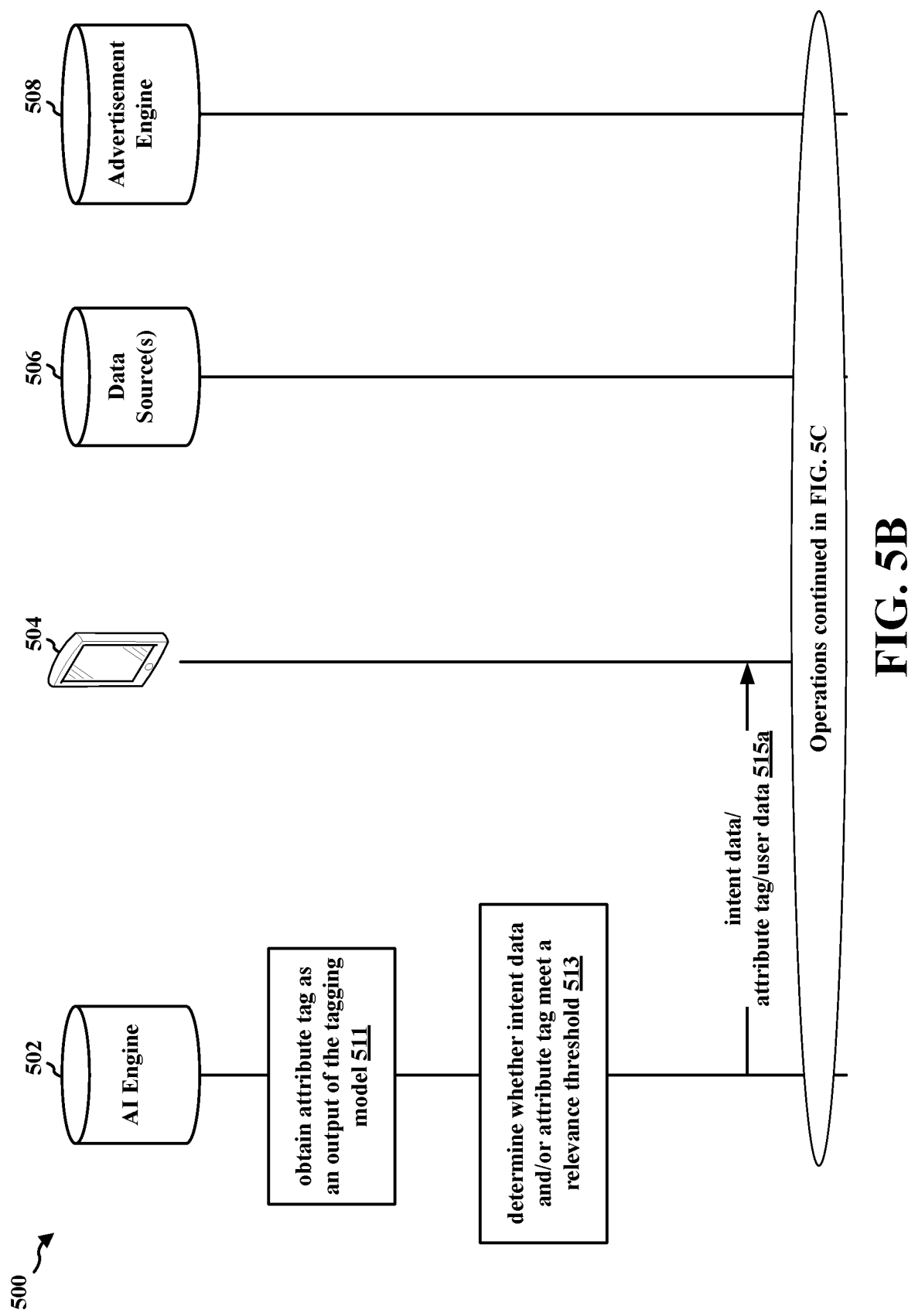

FIGS. 5A-5C illustrate a data flow 500 for communications between an AI engine 502, a feedback device 504, a data source 506, and an advertisement engine 508 in accordance with certain aspects of the disclosure. The AI engine 502 may correspond to, e.g., AI engine 101, 301, 401, 1050, computing device 200, the apparatus 702/702'. The feedback device 504 may correspond to, e.g., feedback device 106a, 106b, 106c, 406, the computing device 200, external device 755. The data source 506 may correspond to, e.g., data source 108, 506, 750, 1055, the computing device 200. The advertisement engine 508 may correspond to, e.g., the advertisement engine 112, the computing device 200, external device 755, the apparatus 1002/1002'. In FIGS. 5A-5C, optional operations may be indicated with dashed lines.

Referring to FIG. 5A, the AI engine 502 may enable (at 501) the feedback device 504 (e.g., an employee of a business that subscribes to the services of the AI engine 502) to set the relevance threshold. In certain aspects, the relevance threshold may be associated with one or more of color, brand, model, size, fit, year, or season. For example, referring to FIG. 4, the sales manager of a car dealership (e.g., the business associated with the feedback device 406) may set the relevance threshold (e.g., by accessing a relevance threshold portal of the AI engine 401) such that one attribute from each of the "Make" and "Model" as well as an attribute from either the "Year" or "Color" category must be indicated by the attribute tag to meet the relevance threshold.

The AI engine 502 may receive (at 503) digital data associated with digital media communications. In certain aspects, the digital data may include textual data from the digital media communications. For example, referring to FIG. 4, when a customer posts a comment (e.g., textual data) or a picture (e.g., image data) on one of her digital media accounts, the AI engine 401 may extract digital data (DD) in the form of textual data and/or image data from the post. In certain configurations, the AI engine 401 may continuously scan for new posts by the customer. Upon detecting a new post by the customer, the AI engine 401 may extract any textual data and/or image data in order to determine whether the user intends to purchase a good or service provided by the business.

The AI engine 502 may input (at 505) the textual data into a natural language processing (NLP) model. For example, referring to FIG. 4, the AI engine 401 may input the extracted digital data into the ML NLP model 450 and the LE NLP component 455.

The AI engine 502 may obtain (at 507) intent data associated with an item as an output of the NLP model. For example, referring to FIG. 4, the ML NLP model 450 may apply a set of pre-identified intent keywords, a set of pre-defined intent images, and/or a deep learning algorithm to the digital data in order to determine the context of the customer's digital media post. For example, the ML NLP model 450 may also determine (e.g., intent data) whether the context of the post suggests a purchase intent, a need for an item or a service, whether the need is immediate, and/or whether the post is requesting a recommendation (e.g., from the digital media community) for an item and/or service.

The AI engine 502 may input (at 509) the intent data into a tagging model. For example, referring to FIG. 4, the AI engine 401 may input intent data into a tagging model that includes the intent component 426, the occurrence component 428, the sentiment component 430, and the attribute component 432.

Referring to FIG. 5B, the AI engine 502 may obtain (at 511) an attribute tag as an output of the tagging model. In certain configurations, the attribute tag may indicate a set of attributes associated with the item. For example, referring to FIG. 4, the attribute component 432 may apply a set of pre-identified attribute keywords, a set of pre-defined attribute images, and/or a deep learning algorithm to the intent data in order to determine whether any attributes (e.g., color, brand, make, model, size, year) are mentioned in the customer's digital media post. The attribute component 432 may output an attribute tag indicating a set of attributes associated with a product or service.

The AI engine 502 may determine (at 513) whether the intent data meets a likelihood threshold and whether the attribute tag meets a relevance threshold. For example, referring to FIG. 4, if the likelihood threshold is "Medium" and the likelihood tag is "Low," the AI engine 401 may determine that the likelihood threshold is not met, and hence, the intent data and attribute tag may not be output to the feedback device 406. Conversely, if the likelihood threshold is "Medium," the AI engine 401 may determine that the customer's likelihood of purchasing a good or service meets the likelihood threshold when the likelihood tag is either "Medium" or "High." Upon determining that the likelihood threshold is met, the AI engine 401 may determine whether the attribute tag meets the relevance threshold. Still referring to FIG. 4, by way of example, assume that in a set of four attribute categories (e.g., "Make," "Model," "Year," and "Color") that each attribute category includes a set of three attributes, e.g., "Ford®/Chevy®/Toyota®" are the three attributes in the "Make" attribute category, "SUV/Truck/Sedan" are the three attributes in the "Model" attribute category, "2018/2019/2020" are the three attributes in the "Year" attribute category, and "White/Black/Silver" are the three attributes in the "Color" attribute category. Using the same example, the sales manager of a car dealership (e.g., the business associated with the feedback device 406) may set the relevance threshold such that one attribute from each of the "Make" and "Model" as well as an attribute from either the "Year" or "Color" category must be indicated by the attribute tag to meet the relevance threshold. In the present example, the relevance threshold may be set based on the inventory of vehicles available for sale at the car dealership. Hence, when the attribute tag indicates Ford®, SUV, and 2020, the relevance threshold of the present example is met. Conversely, when the attribute tag indicates Ford®, Compact, and 2020, the relevance threshold of the present example is not met.

Referring to FIGS. 5B and 5C, the AI engine 502 may output (at 515a, 515b) at least one of the intent data, the user data, the digital data, and/or the attribute tag to an external device (e.g., at least one of the feedback device 504 or the advertisement engine 508) upon determining that the intent data meets the likelihood threshold and that the attribute tag meets the relevance threshold. For example, referring to FIG. 4, one or more of the digital data, intent data, and the attribute tag may be input into one or more of the customer communications component 436, the personalized ads component 438, and/or the analytics component 440 of the feedback device 406 upon determining that the likelihood threshold and the relevance threshold are both met.

The advertisement engine 508 may generate (at 517) an advertisement based at least in part on the intent data and the attribute tag. For example, referring to FIG. 4, the personalized ads component 438 of the feedback device 406 may obtain a digital advertisement that is tailored for the customer based on the digital data extracted from the customer's digital media post from an advertisement engine 508.

The advertisement engine 508 may publish (at 519) the advertisement in a location relative to the digital media communications on the digital media platform. For example, referring to FIG. 4, one or more of the personalized ads component 438 and/or the advertisement engine (e.g., advertisement engine 508) may send the personalized advertisement to one or more of the digital media platforms 412a, 412b, 412c, 412d, 412e for publishing in a digital advertisement space adjacent to the customer's digital media post on which the advertisement is based. In certain aspects, the personalized advertisement may be published in "real-time," meaning that the personalized advertisement may be published in the same login session in which the digital media post was uploaded by the customer.

Figure 6A:
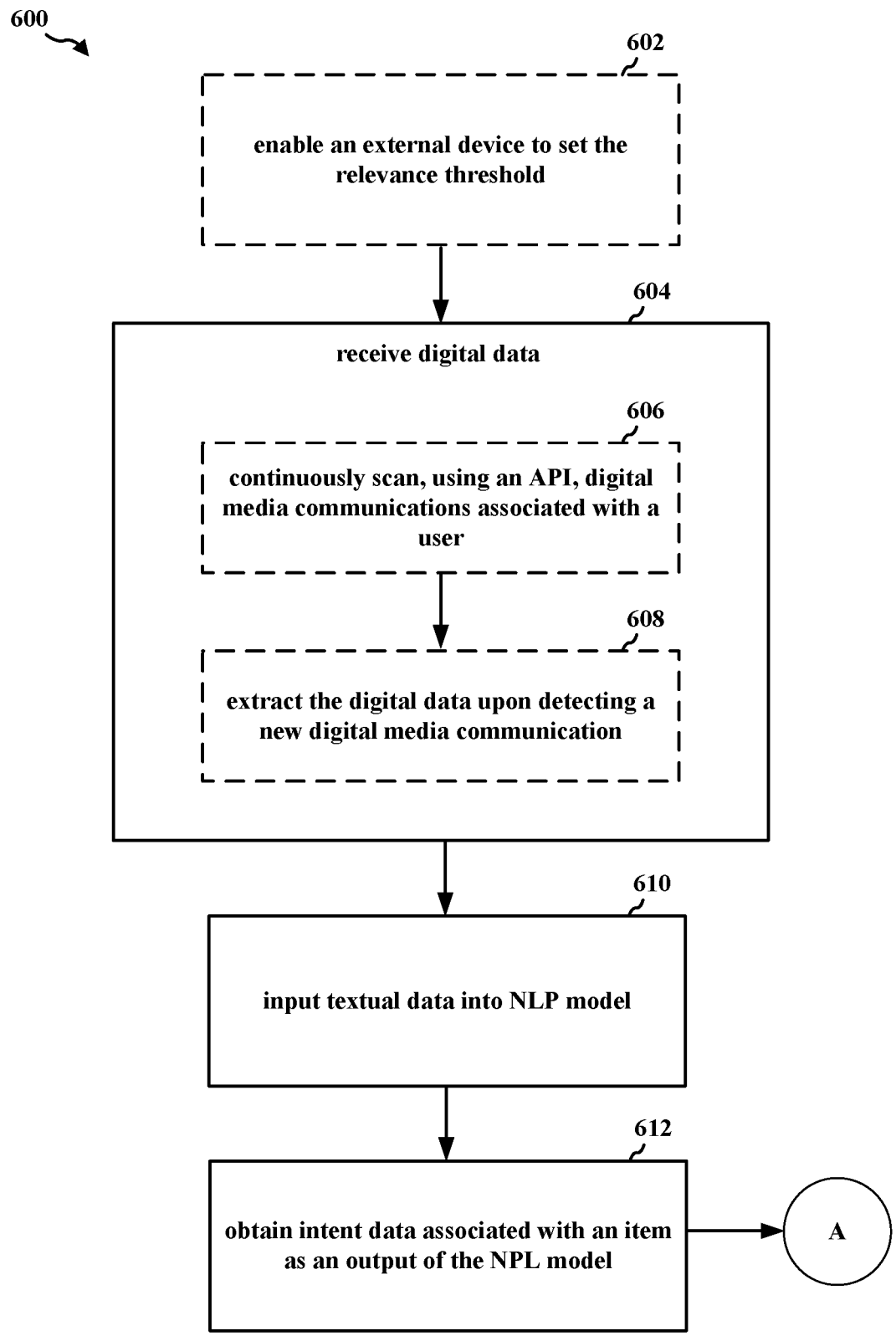
FIGS. 6A-6C are a flowchart of a method of wireless communication.
Figure 6B:
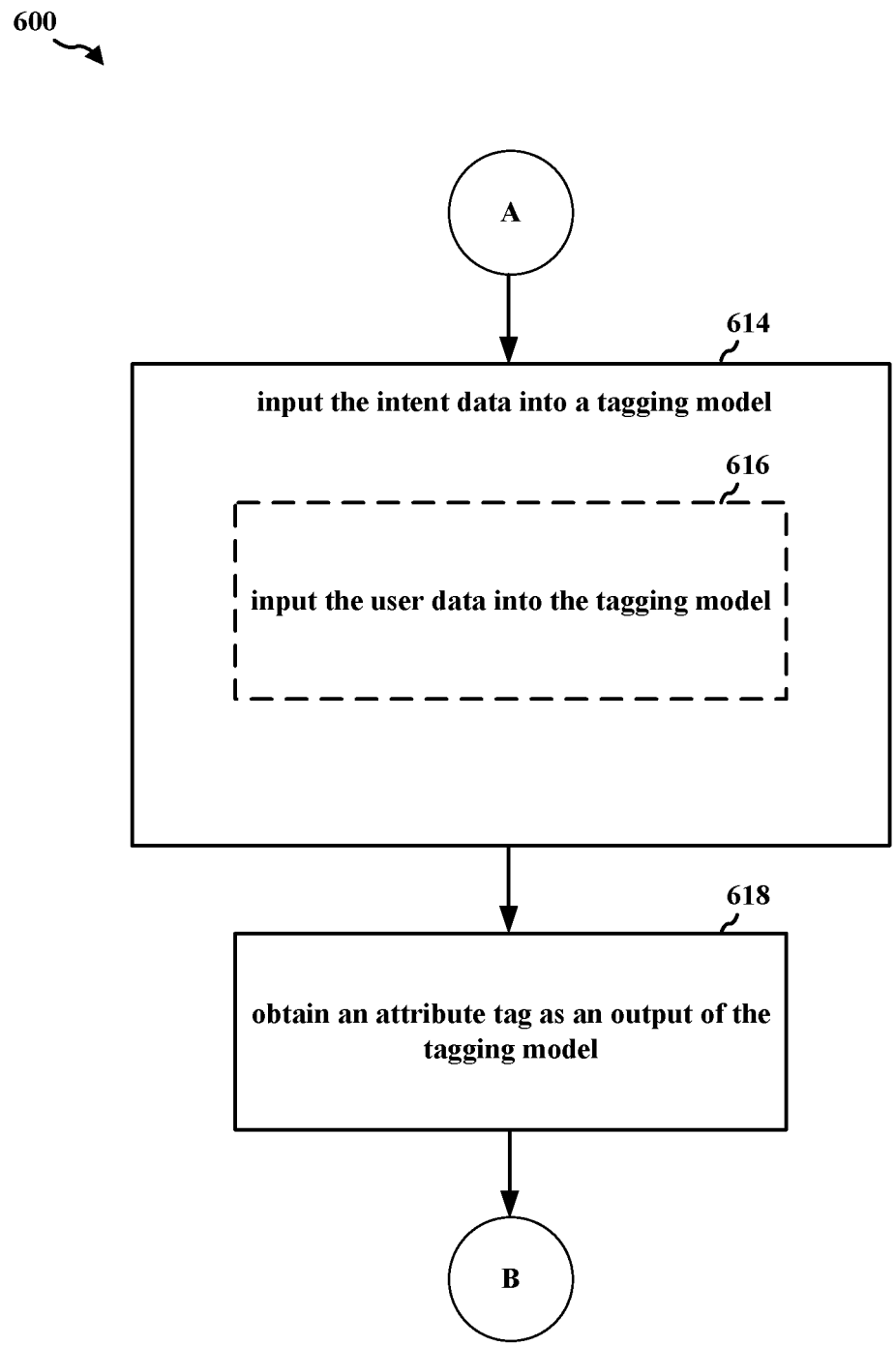
Figure 6C:
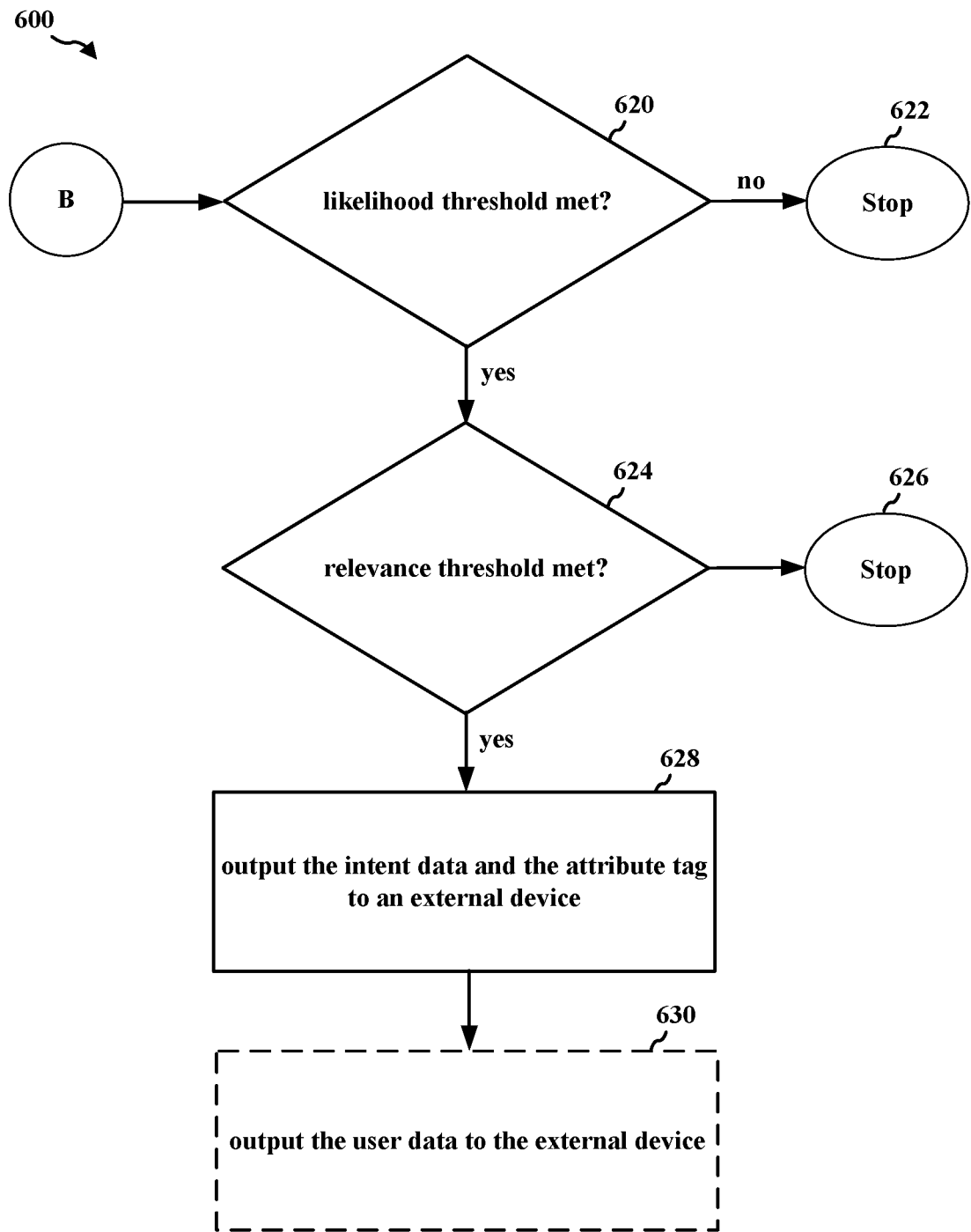

FIGS. 6A-6C are a flowchart 600 of a method of generating a targeted advertisement in accordance with certain aspects of the disclosure. The method may be performed by an AI engine, e.g., AI engine 101, 301, 401, 502, 1050, computing device 200, the apparatus 702/702'. In FIGS. 6A-6C, optional operations may be indicated with dashed lines.

Referring to FIG. 6A, at 602, the AI engine may enable the external device to set the relevance threshold. In certain aspects, the relevance threshold may be associated with one or more of color, brand, model, size, fit, year, or season. For example, referring to FIG. 5A, the AI engine 502 may enable (at 501) the feedback device 504 (e.g., an employee of a business that subscribes to the services of the AI engine 502) to set the relevance threshold. In certain aspects, the relevance threshold may be associated with one or more of color, brand, model, size, fit, year, or season. In another example, referring to FIG. 4, the sales manager of a car dealership (e.g., the business associated with the feedback device 406) may set the relevance threshold (e.g., by accessing a relevance threshold portal of the AI engine 401) such that one attribute from each of the "Make" and "Model" as well as an attribute from either the "Year" or "Color" category must be indicated by the attribute tag to meet the relevance threshold.

At 604, the AI engine may receive digital data associated with digital media communications. In certain aspects, the digital data may include textual data from the digital media communications. For example, referring to FIG. 5A, the AI engine 502 may receive (at 503) digital data associated with digital media communications. In certain aspects, the digital data may include textual data from the digital media communications. In another example, referring to FIG. 4, when a customer posts a comment (e.g., textual data) or a picture (e.g., image data) on one of her digital media accounts, the AI engine 401 may extract digital data (DD) in the form of textual data and/or image data from the post.

In certain implementations of operation 604, the AI engine may receive the digital data associated with digital media communications by (at 606) continuously scanning, using an API, digital media communications. For example, referring to FIG. 4, the AI engine 401 may continuously scan for new posts by the customer.

In certain other implementations of operation 604, the AI engine may receive the digital data associated with digital media communications by (at 608) extracting the digital data, using the API, upon detecting a new digital media communication. For example, referring to FIG. 4, upon detecting a new post by the customer, the AI engine 401 may extract any textual data and/or image data in order to determine whether the user intends to purchase a good or service provided by the business.

At 610, the AI engine may input the textual data into a NLP model. For example, referring to FIG. 5A, the AI engine 502 may input (at 505) the textual data into a natural language processing (NLP) model. In another example, referring to FIG. 4, the AI engine 401 may input the extracted digital data into the ML NLP model 450 and the LE NLP component 455.

At 612, the AI engine may obtain intent data associated with an item as an output of the NLP model. For example, referring to FIG. 5A, the AI engine 502 may obtain (at 507) intent data associated with an item as an output of the NLP model. In another example, referring to FIG. 4, the ML NLP model 450 may apply a set of pre-identified intent keywords, a set of pre-defined intent images, and/or a deep learning algorithm to the digital data in order to determine the context of the customer's digital media post. For example, the ML NLP model 450 may also determine (e.g., intent data) whether the context of the post suggests a purchase intent, a need for an item or a service, whether the need is immediate, and/or whether the post is requesting a recommendation (e.g., from the digital media community) for an item and/or service.

Referring to FIG. 6B, at 614, the AI engine may input the intent data into a tagging model. For example, referring to FIG. 5A, the AI engine 502 may input (at 509) the intent data into a tagging model. In another example, referring to FIG. 4, the AI engine 401 may input intent data into a tagging model that includes the intent component 426, the occurrence component 428, the sentiment component 430, and the attribute component 432.

In certain aspects of operation 614, the intent data may include user data. The user data may include least one of user credentials associated with a set of digital media platforms, a digital media post identification (ID) associated with the digital data, or a purchase history associated with a user.

In certain implementations of operation 614, the AI engine may input the intent data into a tagging model by (at 616) inputting the user data into the tagging model. For example, referring to FIG. 4, the user data may include least one of user credentials associated with a set of digital media platforms 412a, 412b, 412c, 412d, 412e, a digital media post identification (ID) associated with digital media post from which the digital data was extracted, or a purchase history associated with a user. The user data may also be input into the tagging model described above in connection with FIG. 4.

At 618, the AI engine may obtain an attribute tag as an output of the tagging model. In certain aspects, the attribute tag may indicate a set of attributes associated with the item. For example, referring to FIG. 5B, the AI engine 502 may obtain (at 511) an attribute tag as an output of the tagging model. In certain configurations, the attribute tag may indicate a set of attributes associated with the item. In another example, referring to FIG. 4, the attribute component 432 may apply a set of pre-identified attribute keywords, a set of pre-defined attribute images, and/or a deep learning algorithm to the intent data in order to determine whether any attributes (e.g., color, brand, make, model, size, year) are mentioned in the customer's digital media post. The attribute component 432 may output an attribute tag indicating a set of attributes associated with a product or service. The attribute component 432 may output an attribute tag based at least in part on the user data. For example, the attribute tag may include a history tag (e.g., date, price, type of product, etc.) that indicates a purchase history between the customer and the business.

Referring to FIG. 6C, at 620, the AI engine may determine whether the intent data meets a likelihood threshold. For example, referring to FIG. 5B, the AI engine 502 may determine (at 513) whether the intent data meets a likelihood threshold and whether the attribute tag meets a relevance threshold. In another example, referring to FIG. 4, if the likelihood threshold is "Medium" and the likelihood tag is "Low," the AI engine 401 may determine that the likelihood threshold is not met, and hence, the intent data and attribute tag may not be output to the feedback device 406. Conversely, if the likelihood threshold is "Medium," the AI engine 401 may determine that the customer's likelihood of purchasing a good or service meets the likelihood threshold when the likelihood tag is either "Medium" or "High."

Upon determining (at 620) that the likelihood threshold is not met, the operation stops at 622. Otherwise, upon determining (at 620) that the likelihood threshold is met, the operation moves to 624.

At 624, the AI engine may determine whether the attribute tag meet a relevance threshold. For example, referring to FIG. 4, upon determining that the likelihood threshold is met, the AI engine 401 may determine whether the attribute tag meets the relevance threshold. By way of example, assume that in a set of four attribute categories (e.g., "Make," "Model," "Year," and "Color") that each attribute category includes a set of three attributes, e.g., "Ford®/Chevy®/Toyota®" are the three attributes in the "Make" attribute category, "SUV/Truck/Sedan" are the three attributes in the "Model" attribute category, "2018/2019/2020" are the three attributes in the "Year" attribute category, and "White/Black/Silver" are the three attributes in the "Color" attribute category. Using the same example, the sales manager of a car dealership (e.g., the business associated with the feedback device 406) may set the relevance threshold such that one attribute from each of the "Make" and "Model" as well as an attribute from either the "Year" or "Color" category must be indicated by the attribute tag to meet the relevance threshold. In the present example, the relevance threshold may be set based on the inventory of vehicles available for sale at the car dealership. Hence, when the attribute tag indicates Ford®, SUV, and 2020, the relevance threshold of the present example is met. Conversely, when the attribute tag indicates Ford®, Compact, and 2020, the relevance threshold of the present example is not met.

Upon determining (at 624) that the relevance threshold is not met, the operation stops at 626. Otherwise, upon determining (at 624) that the relevance threshold is met, the operation moves to 628.

At 628, the AI engine may output the intent data and the attribute tag to an external device upon determining that the intent data meets the likelihood threshold and that the attribute tag meets the relevance threshold. For example, referring to FIGS. 5B and 5C, the AI engine 502 may output (at 515a, 515b) the intent data and the attribute tag to an external device (e.g., at least one of the feedback device 504 or the advertisement engine 508) upon determining that the intent data meets the likelihood threshold and that the attribute tag meets the relevance threshold. In another example, referring to FIG. 4, one or more of the digital data, intent data, and the attribute tag may be input into one or more of the customer communications component 436, the personalized ads component 438, and/or the analytics component 440 of the feedback device 406 upon determining that the likelihood threshold and the relevance threshold are both met.

At 630, the AI engine may output the user data to the external device upon determining that the intent data meets the likelihood threshold and that the attribute tag meets the relevance threshold. For example, referring to FIGS. 5B and 5C, the AI engine 502 may output (at 515a, 515b) at least one of the intent data, the user data, the digital data, and/or the attribute tag to an external device (e.g., at least one of the feedback device 504 or the advertisement engine 508) upon determining that the intent data meets the likelihood threshold and that the attribute tag meets the relevance threshold.

Figure 7:
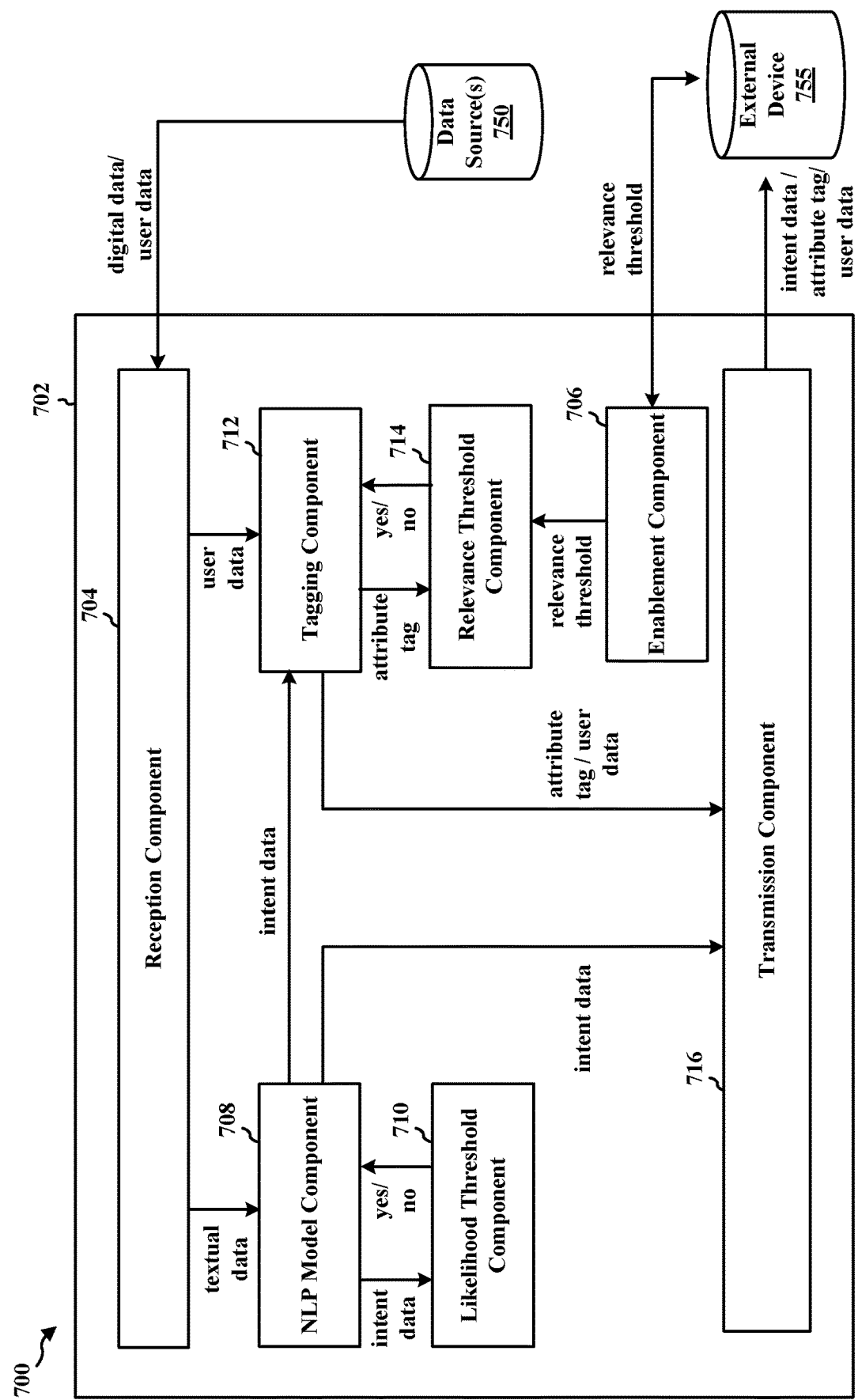
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be an AI engine (e.g., AI engine 101, 301, 401, 502 1050, computing device 200, the apparatus 702') in communication with a data source 750 (e.g., data source 108, 408, 506, 1055) and an external device 755 (e.g., feedback device 106a, 106b, 106c, 406, 504, advertisement engine 112, 508, computing device 200, the apparatus 1002/1002'). The apparatus may include a reception component 704, an enablement component 706, a NLP model component 708, a likelihood threshold component 710, a tagging component 712, a relevance threshold component 714, and a transmission component 716.

Enablement component 706 may be configured to enable the external device 755 to set the relevance threshold. In certain aspects, the relevance threshold may be associated with one or more of color, brand, model, size, fit, year, or season. Information associated with the relevance threshold set by the external device 755 may be sent to relevance threshold component 714.

Reception component 704 may receive digital data associated with digital media communications from the data source 750. In certain configurations, the digital data may include textual data from the digital media communications. In certain implementations, reception component 704 may receive digital data associated with digital media communications by continuously scanning, using an API, digital media communication. In certain implementations, reception component 704 may receive digital data associated with digital media communications by extracting the digital data, using the API, upon detecting a new digital media communication.

Reception component 704 may be configured to input the textual data into NLP model component 708. NLP model component 708 may be configured to obtain intent data based at least in part on the textual data. The intent data may be sent to likelihood threshold component 710 and the tagging component 712. Reception component 704 may be configured to input the digital data the user data into tagging model component 712. Tagging component 712 may obtain an attribute tag as an output. In certain configurations, the attribute tag may indicate a set of attributes associated with an item (e.g., product, service, offering, etc.). Tagging component 712 may be configured to input the attribute tag into relevance threshold component 714.

Likelihood threshold component 710 may be configured to determine whether the intent data meets a likelihood threshold. A signal indicating whether the intent data meets the likelihood threshold may be sent to the NLP model component 708.

Relevance threshold component 714 may be configured to determine whether the attribute tag meet a relevance threshold. A signal indicating whether the attribute tag meets the relevance threshold may be sent to the tagging component 712.

When the output signal of the likelihood threshold component 710 indicates the likelihood threshold is met and output signal of the relevance threshold component 714 indicates that the relevance threshold is met, the NLP model component 708 may out put the intent data to the transmission component 716 and the tagging component 712 may output the attribute tag and/or the user data to the transmission component 716.

The transmission component 716 may be configured to output the user data, the intent data, and the attribute tag to the external device 755.

The apparatus may include additional components that perform each of the blocks of the algorithm in the aforementioned flowcharts of FIGS. 6A-6C. As such, each block in the aforementioned flowcharts of FIGS. 6A-6C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
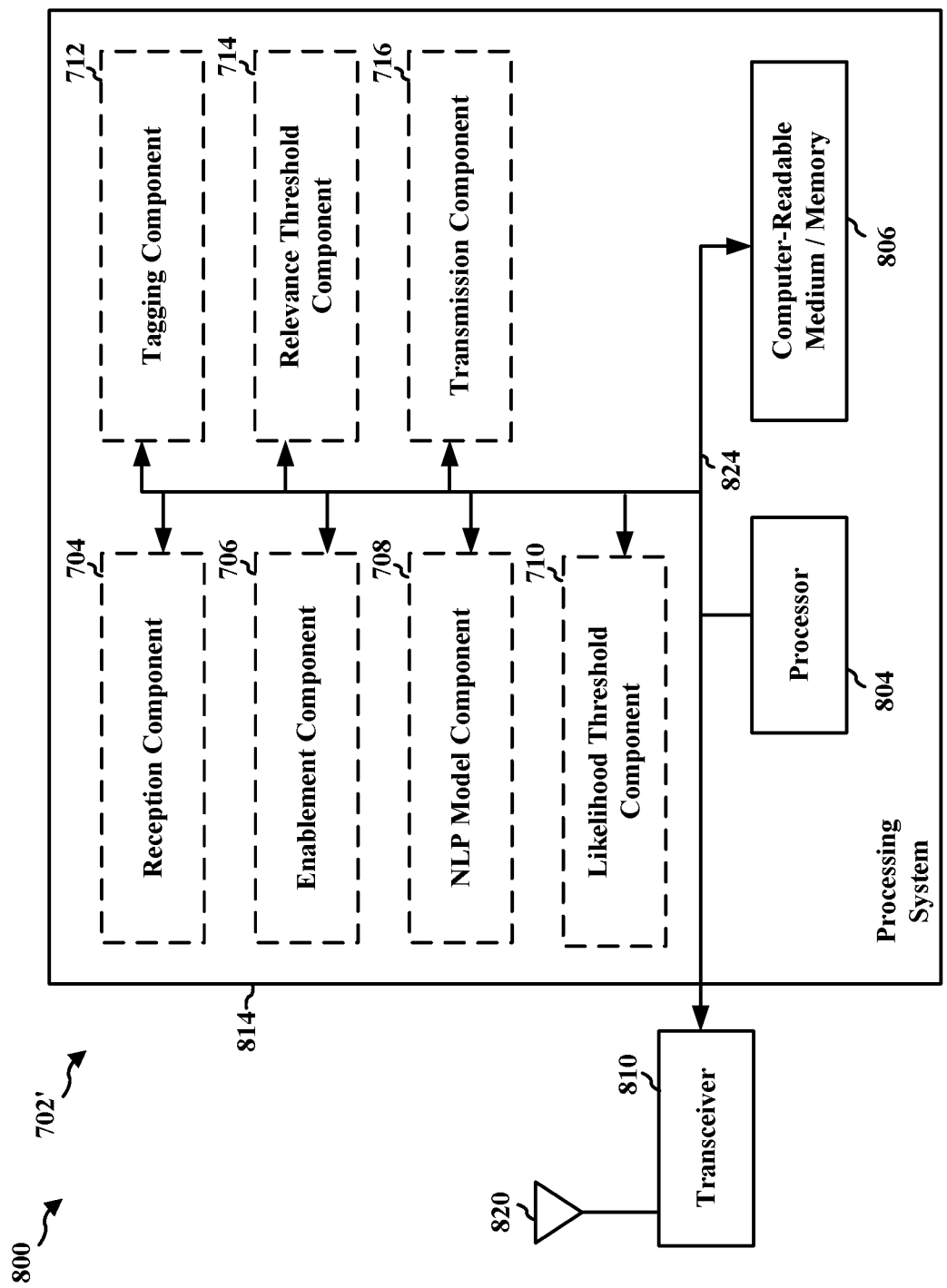
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 716, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716. The components may be software components running in the processor 804, resident/stored in the computer readable medium/memory 806, one or more hardware components coupled to the processor 804, or some combination thereof.

In certain configurations, the apparatus 702/702' for wireless communication may include means for enabling the external device to set the relevance threshold; means for receiving digital data associated with digital media communications; the means for receiving digital data associated with digital media communications may be configured to continuously scan, using an API, digital media communication; the means for receiving digital data associated with digital media communications may be configured to extract the digital data, using the API, upon detecting a new digital media communication; means for inputting the textual data into a NLP model; means for obtaining intent data associated with an item as an output of the NLP model; means for inputting the intent data into a tagging model; means for obtaining an attribute tag as an output of the tagging model, the attribute tag indicating a set of attributes associated with the item; the means for inputting may be configured to input the user data into the tagging model when the at least one of the intent data or the attribute tag meets the likelihood threshold; means for determining whether the intent data meets a likelihood threshold; means for determining whether the attribute tag meet a relevance threshold; means for outputting the intent data and the attribute tag to an external device upon determining that the intent data meets the likelihood threshold and that the attribute tag meets the relevance threshold; and means for outputting the user data to the external device upon determining that the at least one of the intent data or the attribute tag meet the relevance threshold.

The aforementioned means may be the processor(s) 202, the radio 230, the MMU 240, the WLAN controller 250/short-range communication controller 252/the WWAN controller 256, one or more of the aforementioned components of the AI engine 101, 301, 401, 502, the apparatus 702 and/or the processing system 814 of the apparatus 702' configured to perform the functions recited by the aforementioned means.

Figure 9:
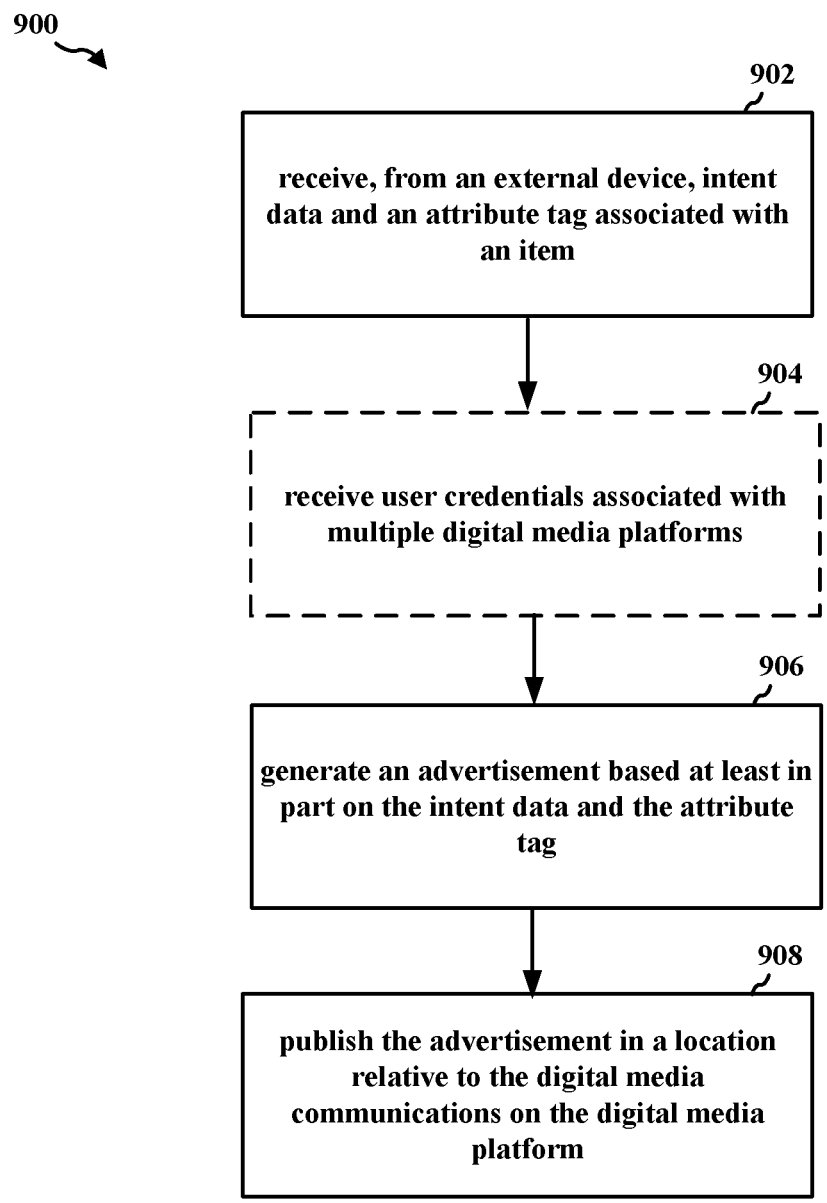
FIG. 9 is a flowchart of a method of wireless communication.

FIG. 9 is a flowchart 900 of a method of generating a targeted advertisement in accordance with certain aspects of the disclosure. The method may be performed by an external device, e.g., feedback device 106a, 106b, 106c, 406, 504, advertisement engine 112, 508, computing device 200, the apparatus 1002/1002'. In FIG. 9, optional operations may be indicated with dashed lines.

At 902, the external device may receive, from an AI engine, intent data and an attribute tag associated with an item. In certain aspects, the intent data and the attribute tag may be related to digital data extracted from digital media communications on at least one digital media platform. For example, referring to FIGS. 5B and 5C, the AI engine 502 may output (at 515a, 515b) at least one of the intent data, the user data, the digital data, and/or the attribute tag to an external device (e.g., at least one of the feedback device 504 or the advertisement engine 508) upon determining that the intent data meets the likelihood threshold and that the attribute tag meets the relevance threshold. In another example, referring to FIG. 4, one or more of the digital data, intent data, and the attribute tag may be input into one or more of the customer communications component 436, the personalized ads component 438, and/or the analytics component 440 of the feedback device 406 upon determining that the likelihood threshold and the relevance threshold are both met.

At 904, the external device may receive user credentials associated with multiple digital media platforms. For example, referring to FIGS. 5B and 5C, the AI engine 502 may output (at 515a, 515b) at least one of the intent data, the user data, the digital data, and/or the attribute tag to an external device (e.g., at least one of the feedback device 504 or the advertisement engine 508) upon determining that the intent data meets the likelihood threshold and that the attribute tag meets the relevance threshold.

At 906, the external device may generate an advertisement based at least in part on the intent data and the attribute tag. For example, referring to FIG. 5C, the advertisement engine 508 may generate (at 517) an advertisement based at least in part on the intent data and the attribute tag. In another example, referring to FIG. 4, the personalized ads component 438 of the feedback device 406 may obtain a digital advertisement that is tailored for the customer based on the digital data extracted from the customer's digital media post from an advertisement engine 508.

At 908, the external device may publish the advertisement in a location relative to the digital media communications on the digital media platform. For example, referring to FIG. 5C, the advertisement engine 508 may publish (at 519) the advertisement in a location relative to the digital media communications on the digital media platform. In another example, referring to FIG. 4, one or more of the personalized ads component 438 and/or the advertisement engine (e.g., advertisement engine 508) may send the personalized advertisement to one or more of the digital media platforms 412a, 412b, 412c, 412d, 412e for publishing in a digital advertisement space adjacent to the customer's digital media post on which the advertisement is based. In certain aspects, the personalized advertisement may be published in "real-time," meaning that the personalized advertisement may be published in the same login session in which the digital media post was uploaded by the customer.

Figure 10:
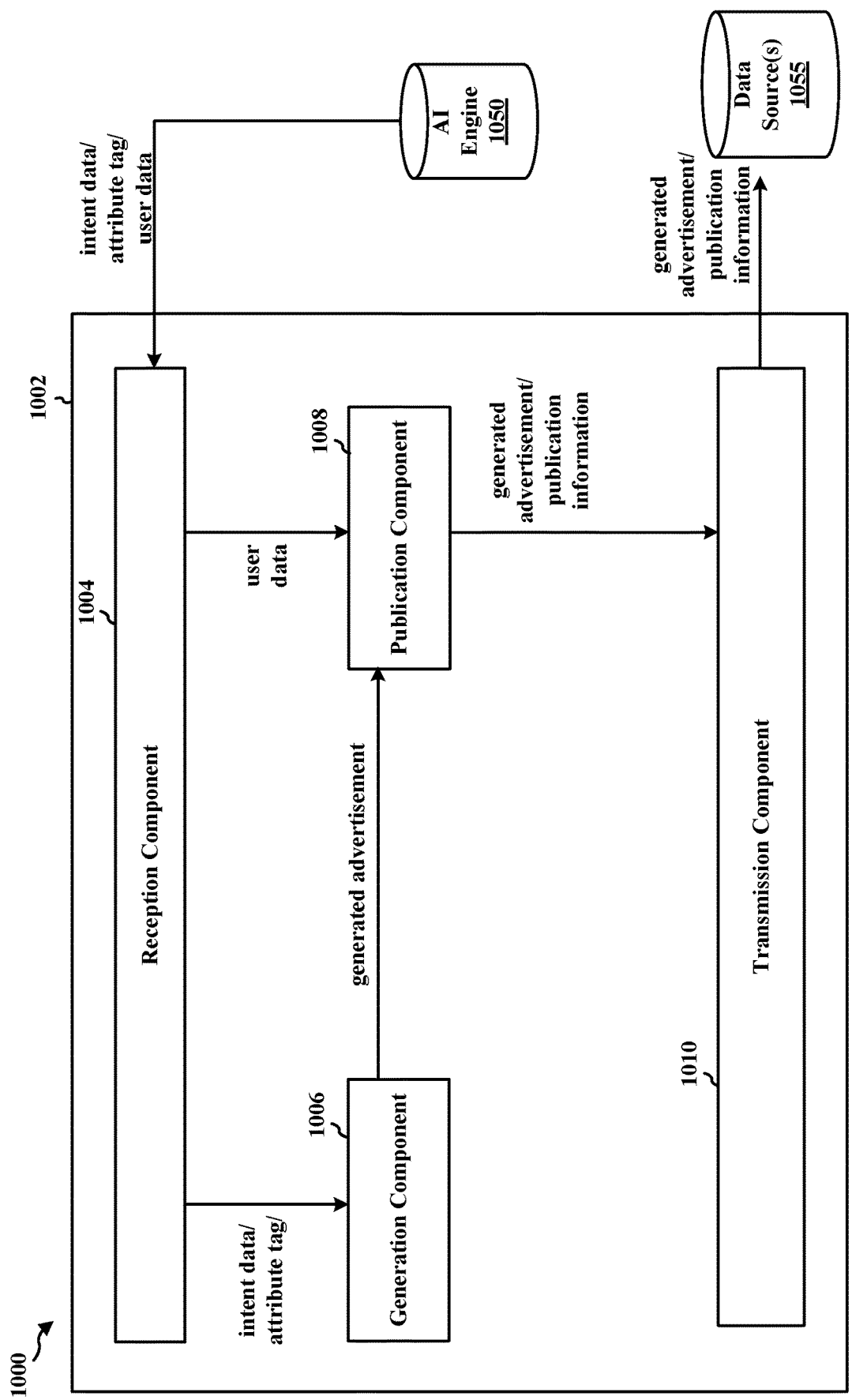
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a first external device (e.g., feedback device 106a, 106b, 106c, 406, 504, advertisement engine 112, 508, computing device 200, the apparatus 1002') in communication with an AI engine 1050 (e.g., AI engine 101, 301, 401, 502, computing device 200, the apparatus 702/702' and a data source 1055 (e.g., data source 108, 408, 506, 750, computing device 200). The apparatus may include reception component 1004, generation component 1006, publication component 1008, and transmission component 1010.

Reception component 1004 may be configured to receive, from AI engine 1050, one or more of user data, intent data and an attribute tag associated with an item. In certain aspects, the intent data and the attribute tag may be related to digital data extracted from digital media communications on at least one digital media platform. One or more of the user data, intent data, the attribute tag may be sent to generation component 1006.

Generation component 1006 may be configured to generate an advertisement based at least in part on one or more of the user data, the intent data and the attribute tag. The generated advertisement may be sent to publication component 1008.

Publication component 1008 may be configured to publish the advertisement in a location relative to the digital media communications on the digital media platform or across multiple digital media platforms by sending the publication information and the advertisement to the transmission component 1010.

Transmission component 1010 may send the publication information (e.g., in which advertisement space on which digital media platform(s)) and the advertisement to the external device 1055.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
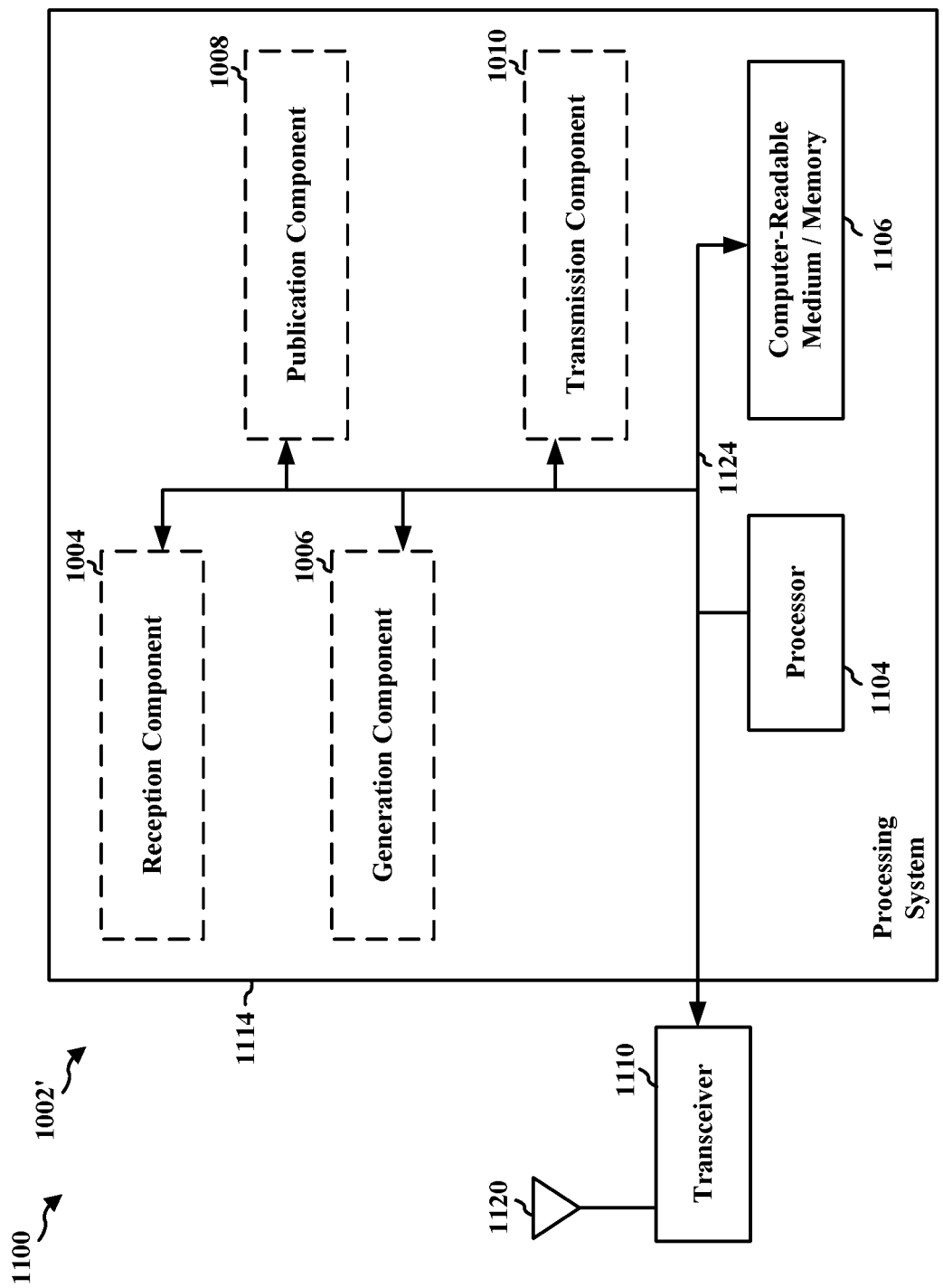
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof.

In certain configurations, the apparatus 1002/1002' for wireless communication may include means for receiving, from an external device, one or more of user data, intent data and an attribute tag associated with an item; means for receiving user credentials associated with multiple digital media platforms; means for generating an advertisement based at least in part on the intent data and the attribute tag; and means for publishing the advertisement in a location relative to the digital media communications on the digital media platform or on multiple digital media platforms (e.g., based at least in part on the user credentials).

The aforementioned means may be the processor(s) 202, the radio 230, the MMU 240, the WLAN controller 250/short-range communication controller 252/the WWAN controller 256, one or more of the aforementioned components of the advertisement engine 112, feedback device 406, apparatus 1002 and/or the processing system 1114 of the apparatus 1002' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "component," "mechanism," "element," "device," and the like may not be a substitute for the word "means." As such, no claim element is to be construed as a means plus function unless the element is expressly recited using the phrase "means for."

What is claimed is:

1. A method of advertisement targeting, comprising:
    with a plurality of applications running on a plurality of computing devices:
        obtaining digital data associated with digital media communications posted on at least one digital media platform by applying screen scraping techniques, the obtained digital data comprising at least one of image data and text data;
    with computing equipment that is associated with the plurality of computing devices:
        extracting textual data from digital data that is posted on a digital media communications platform;
        determining whether one or more words in the extracted textual data express a sentiment that is associated with data in a library of exclusionary terms;
        classifying the digital data into at least one industry category based on whether one or more words in the extracted text is associated with a library of classification terms;
        analyzing the extracted textual data to determine intent related contextual information associated with the digital data, wherein the analysis of extracted data is based on scores assigned to digital data in a training set, and wherein the intent related contextual information indicates a likelihood that a user will purchase a good or a service;
        determining whether the intent related contextual information meets a likelihood threshold;
        identifying one or more attributes from the extracted textual data;
        identifying attribute categories associated with the one or more attributes;
        receiving relevance threshold information comprising an identification of attribute categories that must be present in the extracted textual data to meet the relevance threshold;
        determining whether the relevance threshold is met based on an analysis of the attribute categories received in the relevance threshold information and the digital data, wherein the relevance threshold is met if the attribute categories received in the relevance threshold information are present in the digital file; and
        outputting the digital data and the one or more attributes to an external device.

2. The method of claim 1, further comprising:
    outputting user data associated with a set of digital media communications platforms to the external based on an analysis of the likelihood threshold and the relevance threshold.

3. The method of claim 1, further comprising:
enabling the external device to set the relevance threshold, the relevance threshold being associated with one or more of color, brand, model, size, fit, year, or season.

4. A system for advertisement targeting, comprising:
a computing device comprising:
   a memory storing code; and
   at least one processor coupled to the memory run the code to:
     obtain digital data associated with digital media communications posted on at least one digital media platform by applying screen scraping techniques, the obtained digital data comprising at least one of image data and text data;
computing equipment configured to:
   extract textual data from the obtained digital data;
   determine whether one or more words in the extracted textual data express a sentiment that is associated with data in a library of exclusionary terms;
   classify the digital data into at least one industry category if one or more words in the extracted text is associated with the library of classification terms;
   analyze the extracted textual data to determine intent related contextual information associated with the digital data, wherein the analysis of extracted data is based on scores assigned to digital data in a training set, and wherein the intent related contextual information indicates a likelihood that a user will purchase a good or a service;
   determine whether the intent related contextual information meets a likelihood threshold;
   identify one or more attributes from the extracted textual data;
   identify attribute categories associated with the one or more attributes if the extracted textual data is comprised of one or more attributes;
   receive relevance threshold information comprising an identification of attribute categories that must be present in the extracted textual data to meet the relevance threshold;
   determine whether the relevance threshold is met based on an analysis of the attribute categories received in the relevance threshold information and the digital data; and
   output the digital data and the one or more attributes to an external device.

5. The apparatus of claim 4, wherein the at least one processor is further configured to:
output user data associated with a set of digital media communications platforms to the external device if the likelihood threshold and the relevance threshold are met.

6. The apparatus of claim 4, wherein the at least one processor is further configured to:
enable the external device to set the relevance threshold, the relevance threshold being associated with one or more of color, brand, model, size, fit, year, or season.

* * * * *